United States Patent
Steshenko et al.

(10) Patent No.: US 10,108,412 B2
(45) Date of Patent: Oct. 23, 2018

(54) BLOCKING AND NON-BLOCKING FIRMWARE UPDATE

(71) Applicant: Square, Inc., San Francisco, CA (US)

(72) Inventors: Rodion Steshenko, Union City, CA (US); Jianliang Zhao, Palo Alto, CA (US); Timothy Kordas, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/086,025

(22) Filed: Mar. 30, 2016

(65) Prior Publication Data

US 2017/0286093 A1    Oct. 5, 2017

(51) Int. Cl.
*G06F 9/44*     (2018.01)
*G06F 8/658*    (2018.01)
*H04L 29/08*    (2006.01)
*G06Q 20/20*    (2012.01)

(52) U.S. Cl.
CPC ............. *G06F 8/658* (2018.02); *G06F 8/68* (2013.01); *G06Q 20/20* (2013.01); *H04L 67/34* (2013.01)

(58) Field of Classification Search
CPC ............................................. G06F 8/68
See application file for complete search history.

(56) References Cited

U.S. PATENT DOCUMENTS

| | | | |
|---|---|---|---|
| 6,230,319 B1 | 5/2001 | Britt, Jr. et al. | |
| 6,332,172 B1 | 12/2001 | Iverson | |
| 9,778,928 B1 | 10/2017 | Steshenko et al. | |
| 2004/0205745 A1* | 10/2004 | Piazza | G06F 8/71 717/168 |
| 2009/0279549 A1* | 11/2009 | Ramanathan | G06F 8/65 370/395.4 |
| 2012/0117568 A1* | 5/2012 | Plotkin | G06F 9/4843 718/100 |
| 2012/0198434 A1* | 8/2012 | Dirstine | G06F 8/65 717/170 |

(Continued)

FOREIGN PATENT DOCUMENTS

WO    2017/172953 A1    10/2017

OTHER PUBLICATIONS

Notice of Allowance dated May 18, 2017, for U.S. Appl. No. 15/086,024, of Steshenko, R., et al., filed Mar. 30, 2016.

(Continued)

*Primary Examiner* — Hang Pan
(74) *Attorney, Agent, or Firm* — Maynard Cooper & Gale, P.C.; Ryan J. Letson, Esq.

(57) ABSTRACT

A payment service system may include a server that manages firmware updates for payment devices such as payment readers. A payment reader may access a firmware manifest including a listing of current firmware assets stored at the payment reader, and send the firmware manifest to the server. The server may compare the firmware manifest to available firmware bundles, which are ordered combinations of firmware assets that have been released for usage by payment readers. Some of the bundles may be blocking bundles, while some are non-blocking. If a payment reader is to be updated with a blocking bundle, it cannot process payments during the update. If the update is not a blocking bundle, the payment reader may continue to process payments.

30 Claims, 8 Drawing Sheets

(56) References Cited

U.S. PATENT DOCUMENTS

| | | | |
|---|---|---|---|
| 2012/0278795 A1* | 11/2012 | Bouchier | G06F 8/65 |
| | | | 717/170 |
| 2013/0290945 A1* | 10/2013 | Sawal | G06F 8/67 |
| | | | 717/168 |
| 2014/0108704 A1 | 4/2014 | Boring | |
| 2015/0381203 A1 | 12/2015 | Master et al. | |
| 2016/0226519 A1 | 8/2016 | Meng et al. | |

OTHER PUBLICATIONS

International Search Report and Written Opinion for International Application No. PCT/US2017/024802, dated Jun. 7, 2017.

* cited by examiner

BLOCKING AND NON-BLOCKING FIRMWARE UPDATE

BACKGROUND

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped at the payment terminal and transmits payment information over a secure wireless connection. The payment terminal may receive payment information from the payment device as well information about a transaction, and may communicate this information to a payment system for processing of the transaction.

To support processing of payment transactions, payment terminals generally may operate using various electronic components. Many components of payment terminals may contain instructions, such as instructions that generally allow the payment terminal to carry out operations for processing payment transactions. The instructions may include a boot loader that initialized the payment terminal and one or more firmware modules that control the operation of the payment terminal and various components thereof.

From time-to-time, the firmware of the payment terminal or of particular components thereof may require updating, for example, to enhance security, implement additional functionality, and fix bugs. It may be desired to deliver the firmware update to the payment terminal over a network, as opposed to delivering the firmware update via a physical memory device such as a memory stick. However, a payment terminal may be located at a remote location, such as at a merchant operating a store at a fixed location, or in some cases, at a traveling merchant such as a taxi driver, food truck, repairman, or medical professional. Accordingly, such a payment terminal may only be in communication with a network relatively infrequently.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
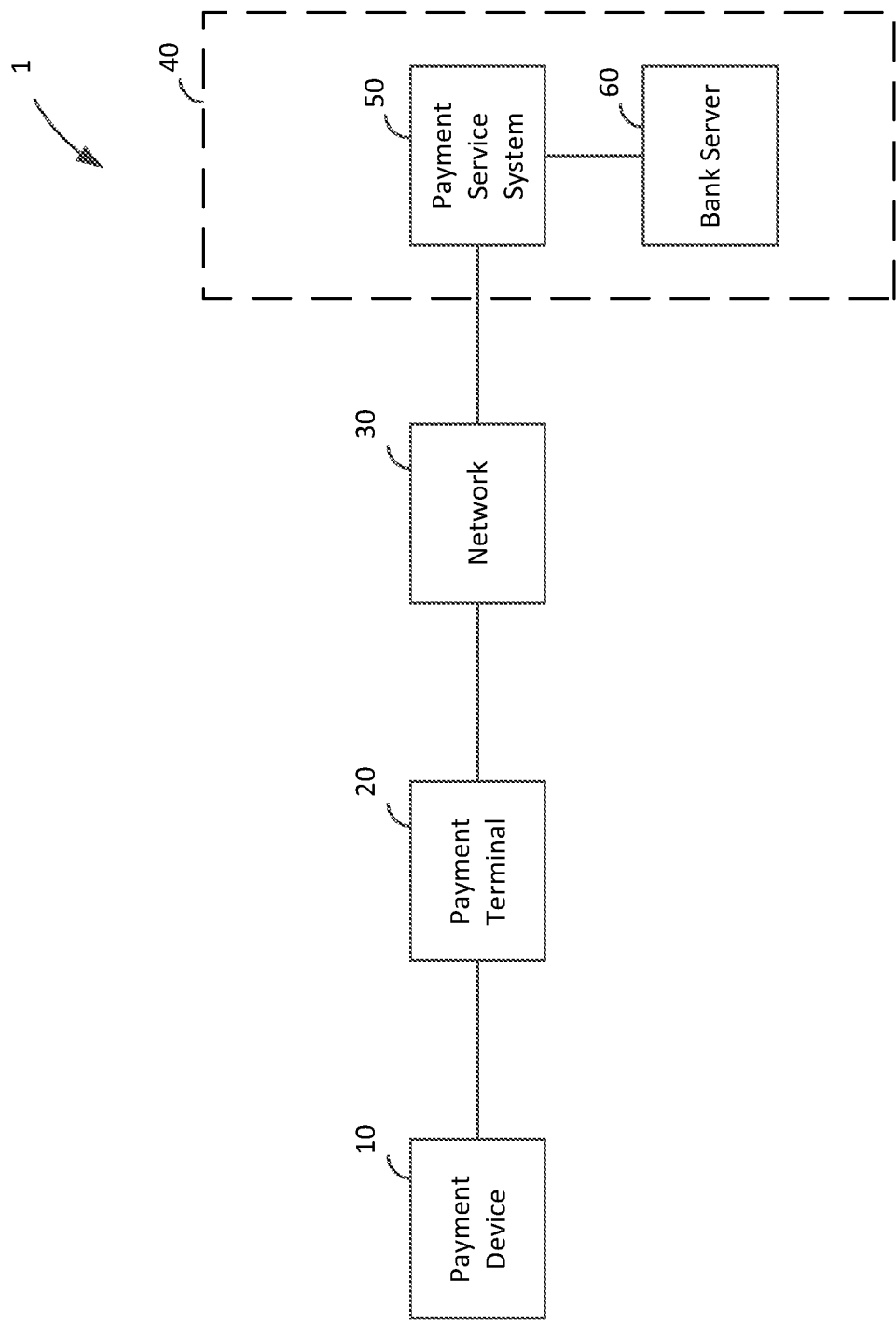
FIG. 1 shows an illustrative block diagram of a payment system in accordance with some embodiments of the present disclosure.

A payment device such as a payment reader may include a number of firmware assets that correspond to different components and subsystems of the payment reader. Each firmware asset may be individually updateable, such that an update of the firmware of a payment reader does not require the update of all firmware assets. The payment device may be in communication with an external system such as a server of a payment service system. This server may provide the payment reader with updates to the firmware assets, which the payment reader may receive and install. In order to determine which firmware assets need to be updated, the payment reader may generate a firmware manifest that provides the current firmware version for each firmware asset that is currently stored at the payment reader. This may be transmitted to the payment service system.

The payment service system may use this firmware manifest to determine which firmware versions need to be updated at the payment reader, and whether the update is a blocking update or a non-blocking update. During a blocking update, the payment reader may be prohibited from processing payments until the update is complete. Such an update may degrade the user experience, since payments cannot be processed during this time. A non-blocking update may allow the payment reader to process payments while the firmware is being updated in the background. For example, a firmware update may be downloaded to memory of the payment reader while transactions are being processed, and the update may overwrite the current firmware version at reboot, after a certain period of time has passed since transactions have been processed, or based on other criteria.

The payment service system may analyze the firmware manifest based on a comparison of the firmware versions in the firmware manifest to a plurality of firmware bundles. Each firmware bundle may include a released combination of versions for the firmware assets. The firmware bundles may also include a particular implied ordering of the firmware assets, such that updates for each asset are provided to the payment reader in a that particular order. By providing a limited number of firmware bundles, and a required ordering, it may also be understood that there exist certain transition states between bundles. These transition states may be conditions under which a subset of the firmware assets for a particular bundle has been updated at the payment reader, and those assets have been updated in the correct order.

If the firmware versions of the firmware manifest do not correspond to a firmware bundle or a transition state, then the payment reader does not have an authorized collection of firmware versions and must stop processing transactions immediately. Even if the firmware versions of the payment reader have been authorized, the payment service system may also search to see if any subsequent bundles have been listed as blocking bundles. Blocking bundles may correspond to critical updates that address issues such as security features or core payment reader functionality. If a subsequent blocking bundle is found, the payment reader must stop processing transactions immediately. A parallel processing indicator may be provided that tells the payment reader whether it must stop processing.

The payment service system may also identify the firmware assets to send to the payment reader. This identification may be based on whether a subsequent blocking bundle exists. If a subsequent blocking bundle exists, the payment service system may skip other bundles and update immediately to a subsequent blocking bundle or a non-blocking bundle subsequent to the blocking bundle. If a subsequent blocking bundle does not exist, the firmware assets may be updated to the versions of the next available firmware bundle.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In some embodiments, the payment server 40 may request information about firmware instructions stored at the payment terminal 20 (e.g., versions of instructions stored in memory). Firmware instructions may be executed by processors or other hardware of one or more components of the payment terminal in order to generally control the operations of the payment terminal and components thereof. In response to the request for information, the payment terminal 20 may gather information about the payment terminal 20, including information about firmware stored in its memory, to generate a firmware manifest. In some embodiments, this firmware manifest information may be transmitted to the payment server 40 (e.g., the payment service system 50) for processing.

In some embodiments, payment server 40 (e.g., payment service system 50 of payment server 40) may determine whether an update of the firmware of payment terminal 20 is required based on the firmware manifest. If an update is required, payment terminal 40 may access a firmware update to provide to the payment reader as a set of blocks of firmware data. The blocks of firmware data may be compressed, and the compressed firmware update blocks and information about the compressed firmware update blocks may be provided to the payment terminal 20. In some embodiments, the payment terminal 20 may receive the compressed firmware update blocks and information from the payment server 40 and store them at the payment terminal 20 (e.g., in memory of the payment terminal 20). The payment terminal 20 may perform a check of its memory, and continue to receive compressed firmware update blocks from the payment server 40 based on its memory check. The payment terminal 20 may perform an additional check of its memory and determine that it has received the entire firmware update based on information about the compressed firmware update blocks from the payment server 40. The payment terminal 20 may update the firmware of payment terminal 20.

Figure 2:
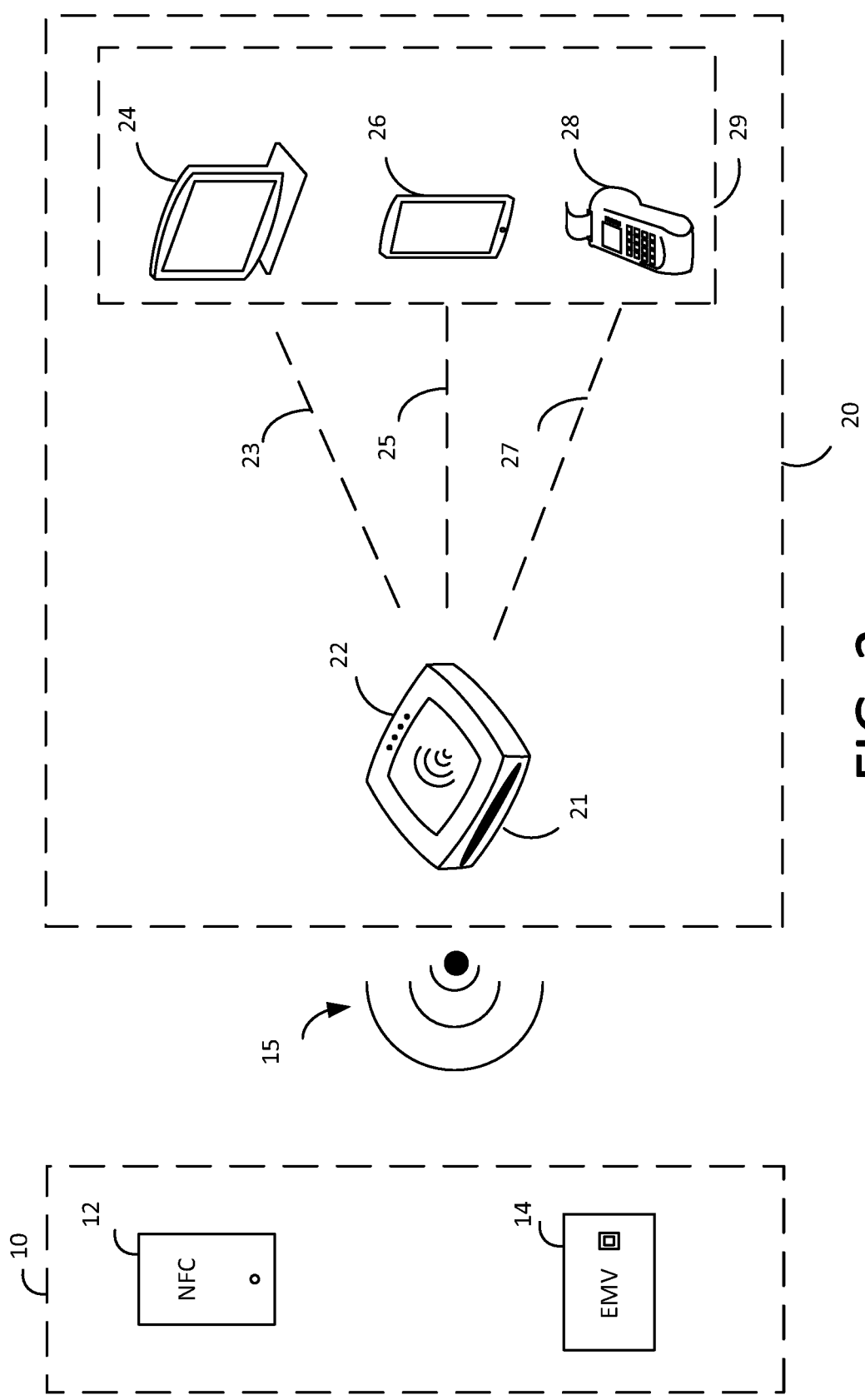
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Payment terminal 20 (e.g., payment reader 22 of payment terminal 20) may have various components that have firmware. In some embodiments, it may be necessary for firmware to be updated, for example, to fix bugs or resolve issues with or enhance the security of the device. As an example, regulations or standards applicable to transactions involving various methods that may be used by payment devices 10 (e.g., NFC communications and EMV cards) may require the payment terminal 20 (e.g., the payment reader 22) to follow new instructions or procedures when processing the transactions. This may require the firmware of the payment reader 22 or some component thereof to be updated in order for the payment reader 22 to process transactions using the new instructions. In some embodiments, other components of the payment terminal 20 may have firmware (e.g., merchant device 29) that requires updating. It will further be understood that firmware of a payment reader 22, merchant device 29, or any component of either, may require updating for any suitable reason.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
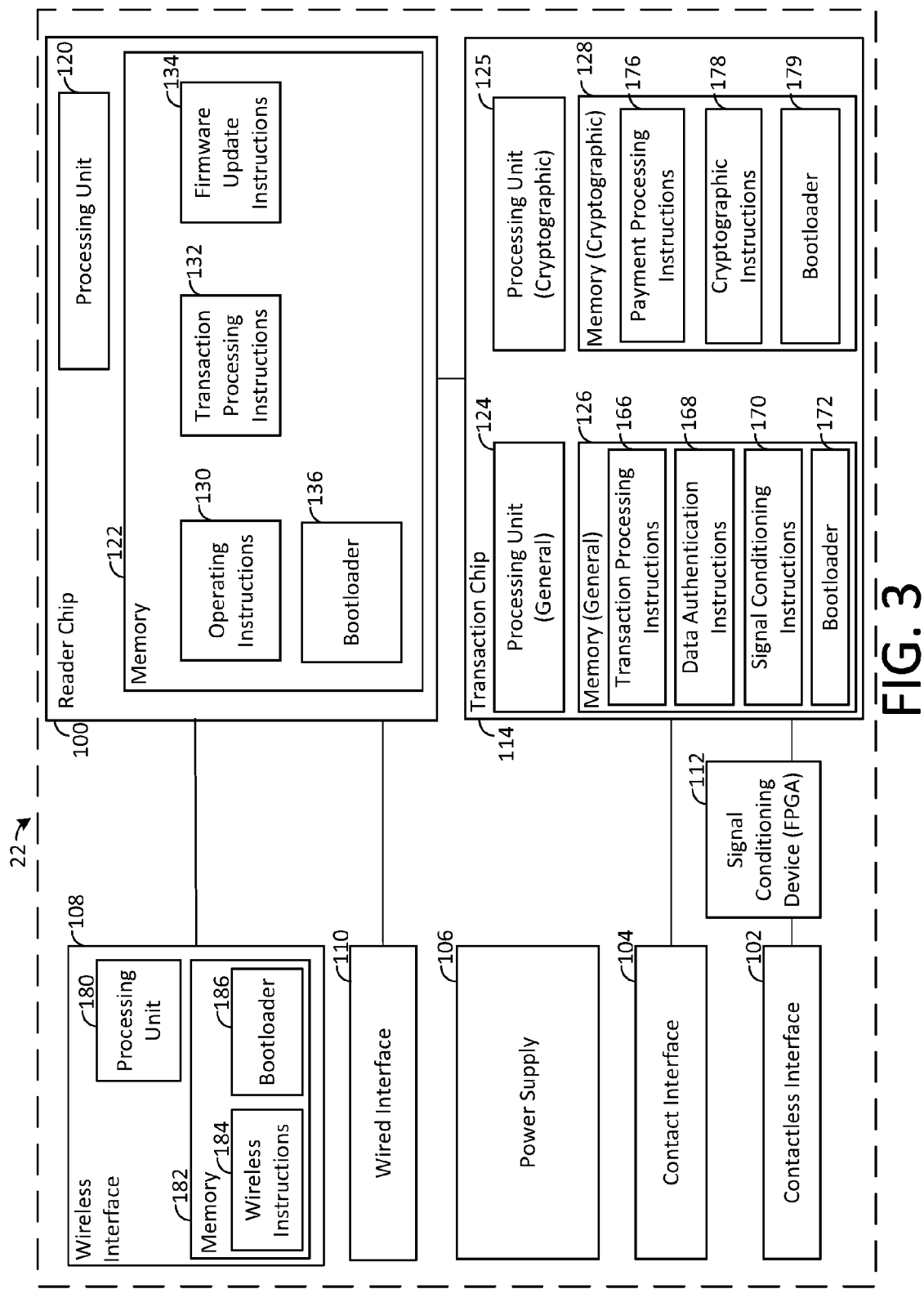
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using Bluetooth classic or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a reader chip 100, a plurality of payment interfaces (e.g., a contactless interface 102 and a contact interface 104), a power supply 106, a wireless communication interface 108, a wired interface 110, a signal conditioning device 112, and a transaction chip 114. Payment reader 22 also includes a processing unit 120 and memory 122 in reader chip 100, and general processing unit 124, cryptographic processing unit 125, general memory 126 and cryptographic memory 128 in transaction chip 114. Although in one embodiment the processing unit 120 and memory 122 will be described as packaged in a reader chip 100 and transaction chip 114 respectively, and configured in a particular manner, it will be understood that processing unit 120, general processing unit 124, cryptographic processing unit 125, memory 122, general memory 126, and cryptographic memory 128 may be configured in any suitable manner to perform the functionality of the payment reader 22 as is described herein. It will also be understood that the functionality of reader chip 100 and transaction chip 114 may be embodied in a single chip or a plurality of chips, each including any suitable combination of processing units and memory to collectively perform the functionalities of reader chip 100 and transaction chip 114 as described herein.

In some embodiments, reader chip 100 may be any suitable chip, such as a K21 chip supplied by Freescale Semiconductor, Inc. Processing unit 120 of reader chip 100 of payment reader 22 may be any suitable processor and may include any suitable hardware, software, memory, and circuitry as is necessary to perform and control the functions of payment reader 22. Processing unit 120 may include any suitable number of processors, and may perform the operations of reader chip 100 based on instructions in any suitable number of memories and memory types. In some embodiments, processing unit 120 may have multiple independent processing units, for example a multi-core processor or other suitable component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Transaction chip 114 may include one or more processors having processing capability necessary to perform the processing functions described herein, including but not limited to hardware logic, computer readable instructions running on a processor, or any suitable combination thereof. In an exemplary embodiment, transaction chip 114 may perform functionality relating to processing of payment transactions, interfacing with payment devices, cryptography, and other payment-specific functionality. In some embodiments, transaction chip 114 may include a general processing unit 124 for executing instructions associated with general payment functionality and a cryptographic processing unit 125 for handling cryptographic processing operations. Each of general processing unit 124 and cryptographic processing unit 125 may have dedicated memory associated therewith (i.e., general memory 126 and memory such as cryptographic memory 128). In this manner, specific cryptographic processing and critical security information (e.g., cryptographic keys, passwords, user information, etc.), may be securely stored and processed by cryptographic memory 128 and cryptographic processing unit 125.

One or both of general processing unit 124 and cryptographic processing unit 125 of transaction chip 114 may communicate with reader chip 100 (e.g., processing unit 120), for example, using any suitable internal bus and communication technique. In this manner, reader chip 100 and transaction chip 114 can collectively process transactions and communicate information regarding processed transactions (e.g., with merchant device 29).

Transaction chip 114 may also include circuitry for interfacing with a contact interface 104 (e.g., power and communication circuitry for directly interfacing with an EMV chip of a chip card 14 that is inserted in slot 21). In some embodiments, transaction chip 114 may also include analog front end circuitry for interfacing with the analog components of contactless interface 102 (e.g., electromagnetic compatibility (EMC) circuitry, matching circuits, modulation circuitry, and measurement circuitry).

In some embodiments, general processing unit 124 may include any suitable processor for performing the payment processing functionality of payment reader 22 described herein. In some embodiments, general memory 126 may be any suitable memory (e.g., as described herein), and may include a plurality of sets of instructions for performing general transaction processing operations of payment reader 22, such as transaction processing instructions 166, data authentication instructions 168, signal conditioning instructions 170, any of which may be implemented in entirely or partially in firmware stored at memory 126. General memory 126 may also include a bootloader 172 that may initialize the processing unit 124 and firmware stored within general memory 126 (e.g., firmware including some or all of instructions 166, 168, and 170, and any other suitable instructions).

Transaction processing instructions 166 may include instructions for controlling any suitable general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing. Data authentication instructions 168 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific). In some embodiments, the data authentication instructions 168 may be implemented as a separate portion of firmware stored in a unique memory location from the other firmware instructions of the general memory 126. In this manner, it may be possible to selectively update the firmware associated with the data authentication instructions 168 without impacting any other firmware instructions associated with the general processing unit 124 and general memory 126 of transaction chip 114.

Signal conditioning instructions 170 may include instructions for interacting with signal conditioning device 112, including instructions for conditioning signals received from a payment device 10 via the contactless interface 102 (e.g., from a NFC payment device 10). Although in some embodiments, signal conditioning instructions 170 may include instructions for manipulating signals received via contactless interface 102, wherein the signal conditioning device 112 is a field programmable gate array (FPGA), in other embodiments, signal conditioning instructions 170 may include instructions for conditioning signals using any suitable hardware, logic, or algorithm required to process NFC signals received via contactless interface 102.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Cryptographic memory 128 may also include a bootloader 179 that may initialize the processing unit 125 and firmware stored within cryptographic memory 128 (e.g., firmware including some or all of instructions 176 and 178). Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Wireless communication interface 108 may include any suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit 180 and memory 182. Although in one embodiment, the processing unit 180 and memory 182 will be described as packaged in a wireless communication interface 108 and configured in a particular manner, it will be understood that processing unit 180 and memory 182 may be configured in any suitable manner to perform the functionality of the wireless communication interface 108 as is described herein.

Processing unit 180 may include any suitable processor or processing hardware for performing the functionality described herein. In some embodiment, processing unit 180 may execute the instructions of memory 182 to interact with and control hardware and other components of the wireless communication interface 108 in order to transmit and receive wireless communications (e.g., via Bluetooth low energy) and to communicate with other circuitry (e.g., processing unit 120 of reader chip 100) of payment reader 22 (e.g., using an internal bus or any other suitable communication method). Memory 182 is memory, as described herein, and may include a plurality of sets of instructions for performing the processing operations of wireless communication interface 108, such as wireless instructions 184. In some embodiments, memory 182 may be implemented as static random-access memory (SRAM), but any suitable memory format may be used to carry out the functionality of payment reader 22 as described herein. Bootloader 186 that may initialize the processing unit 180 and firmware stored within memory 182 (e.g., firmware including some or all of wireless instructions 184).

Although signal conditioning device 112 may include any suitable hardware, software, or any combination thereof, in an exemplary embodiment signal conditioning device may comprise an FPGA. Signal condition device 112 may receive and conditioning signals sent from contactless interface 102, such as when a payment device 10 using NFC communication communicates with payment reader 22. In an embodiment, signal conditioning device 112 may operate based on instructions stored at transaction chip 114 (e.g., signal conditioning instructions 170) for use in interacting with the contactless interface 102. In some embodiments, these instructions may be stored as firmware, and in some embodiments the instructions (e.g., signal conditioning instructions 170) may be individually updateable.

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

Power supply 106 may include one or more power supplies such as a physical connection to AC power or a battery. Power supply 106 may include power conversion circuitry for converting AC power and generating a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wired interface 110 may include any suitable interface for wired communication with other devices or a communication network, such as USB, Lightning, FireWire, Ethernet, any other suitable wired communication interface, or any combination thereof. In some embodiments, wired interface 110 may allow payment reader to communicate with one or both of merchant device 29 and payment server 40.

Memory 122 of reader chip 100 may include a plurality of sets of instructions for controlling operations of payment reader 22, such as operating instructions 130, transaction processing instructions 132, firmware update instructions 134, and bootloader 136.

Operating instructions 130 may include instructions for controlling any suitable general operations of the payment reader 22, such as internal communications, power management, processing of messages, system monitoring, sleep modes, user interface response and control, operation of the wireless interface 108, operation of the transaction chip 114, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, invoking the transaction chip 114 to process that payment information, and by generating responsive messages that are transmitted to the point-of-sale application of the merchant device via wireless interface 108.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100 and transaction chip 114) and communicate that processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with transaction chip 114 to perform most transaction processing operations.

Firmware update instructions 134 may include instructions for updating firmware of the various components of payment reader 22. Although particular components of the payment reader 22 are described herein as having firmware that must be updated, it will be understood that payment reader 22 may include additional components that have firmware, one or more of the components in FIG. 3 may not store firmware, and that locations at which firmware is stored within the payment reader 22 may be rearranged in any suitable manner. Additionally, although the firmware update instructions 134 may perform any suitable operations when executed by processing unit 120, in some embodiments, firmware update instructions 134 may generate firmware manifests for firmware stored at various components of payment reader 22, communicate regarding the firmware manifest, receive firmware that is temporarily stored in a memory (e.g., flash memory of reader chip 100), determine whether all firmware for a particular update was received by the payment reader, request additional firmware until an update is complete (e.g., based on an offset value), and update the firmware of a particular component once the entire firmware update is received.

In some embodiments, firmware update instructions 134 may include instructions for receiving and processing requests for a firmware manifest received by the payment reader 22. Although firmware update instructions 134 may be used to receive requests for firmware manifests at the payment reader 22 by any suitable type of communication, in one embodiment, firmware update instructions 134 may receive a request for a firmware manifest from wireless interface 108 (e.g., via a Bluetooth low energy message) or wired interface 110.

In some embodiments, firmware update instructions 134 may include instructions for generating a firmware manifest containing information about the firmware stored in components of the payment reader 22. As described herein, a firmware manifest may include a variety of information in accordance with the present disclosure. Firmware update instructions 134 may request information from components of payment reader 22 about firmware stored in memory of the component. In some embodiments, the information may include information that may be used to identify the firmware version associated with a component, such as a firmware version, firmware name, hash value, CRC, section of code, any other suitable method of identifying the firmware, or any combination thereof. In some embodiments, firmware update instructions 134 may request information about firmware stored in any of the components of payment reader 22 in order to generate a firmware manifest. In an embodiment, firmware update instructions 134 may request information about firmware stored in memory of wireless interface 108 (e.g., wireless firmware), reader chip 110 (e.g., operating firmware), signal conditioning instructions 170 of transaction chip 114 (e.g., signal conditioning firmware), data authentication instructions 168 of transaction chip 114 (e.g., data authentication firmware), firmware of general memory 126 of transaction chip 114 (e.g., transaction firmware), and firmware of a cryptographic memory of transaction chip 114 (e.g., cryptographic firmware). The firmware manifest may include identifying information (e.g., a firmware version) for each of these portions of firmware.

In some embodiments, firmware update instructions 134 may include instructions for transmitting firmware manifests, for example, to a merchant device 29 or payment server 40. Transmission can be in a variety of forms, including messages exchanged with a merchant device 29 via wireless interface 108 or wired interface 110 or in any other suitable manner. In some embodiments, firmware update instructions 134 may provide instructions for processing unit 120 to generate and send the firmware manifest.

In some embodiments, firmware update instructions 134 may include instructions for receiving a first portion of a plurality of compressed firmware update blocks, for example, from a merchant device 29. In some embodiments, a merchant device 29 may receive compressed firmware update blocks from payment server 40, each of which includes a block of compressed instructions, that when decompressed (and processed in any other suitable manner as required, e.g., decrypted) comprise a firmware update for one or more components of the payment reader 22. For example, payment server 40 may transmit a plurality of compressed firmware update blocks that together include a compressed version of a firmware update to the merchant device 29. The merchant device 29 may then transmit each block of the compressed firmware update to the payment reader 22. In some embodiments, the payment reader 22 may only remain active for a portion of the attempted firmware update, such that only a portion (e.g., a first portion) of the plurality of compressed firmware update blocks are received and stored (e.g., in flash memory of memory 122 of reader chip 100), at the payment reader 22. In some embodiments, firmware update instructions 134 may be used to continue to monitor communications with the merchant device 29, and may be used to provide instructions to the processing unit 120 for processing received compressed firmware update blocks and storing those blocks in memory (e.g., flash memory).

In some embodiments, firmware update instructions 134 may include instructions for decrypting and decompressing received compressed firmware update blocks. Although decryption and decompression may be performed in any suitable manner based on any suitable encryption and compression methods, in some embodiments encryption may include public-key encryption methods (e.g., Triple DES, RSA) or symmetric-key encryption methods (e.g., Blowfish, Twofish or Advanced Encryption Standard (AES)), while compression may include lossy compression (e.g., JPEG or MPEG algorithms) or lossless compression (e.g. PNG, or GIF algorithms). In an embodiment, processing unit 120 may execute firmware update instructions 134 to identify the particular encryption and compression methods and perform encryption and decompression of compressed firmware update blocks based thereon. The firmware instructions may then be stored in memory (e.g., flash memory of memory 122 of reader chip 100).

In some embodiments, firmware update instructions 134 may include instructions for determining whether an entire firmware update has been received at the payment reader 22. In some embodiments, the processing unit 120 may execute firmware update instructions 134 to compare information about data received and stored in memory with information about the firmware update (e.g., an uncompressed firmware update size) provided by the payment server 40. The firmware update instructions 134 may provide instructions to compare the firmware update stored in memory to the information about the firmware update (e.g., firmware update size), for example, for example, if the processing unit 120 determines that the payment reader 22 has received and decompressed all of the compressed firmware update blocks sent from the merchant device 29.

In some embodiments, if the entire firmware update has not been received, firmware update instructions 134 may include instructions for determining how much of the firmware update has been received. This determination may be performed in any suitable manner that may determine an amount of firmware that has been successfully received, for example, by identifying a last or recent firmware instruction that was successfully received and identifying an offset associated with that instruction. In some embodiments where the firmware is decompressed before being stored in memory, this offset may correspond to an uncompressed firmware offset. Although the uncompressed firmware offset may be identified in any suitable manner, in some embodiments a memory storing the received and decompressed firmware update may include locations including calculated cyclic redundancy check (CRC) values. An uncompressed firmware offset may be identified based on portions of memory where the CRC value is correct. Although the offset may be determined in any suitable manner based on these memory locations, in some embodiments the most recent firmware instruction that is associated with a good CRC value may be selected to determine the uncompressed firmware offset. In some embodiments, the total number of firmware instructions prior to this most recent instruction may be used as the value, which may function as a partial firmware offset that is used (e.g., by merchant device 29) to determine the next block of firmware to transmit to the to identify the next compressed firmware block to the transmit to the payment reader 22.

In some embodiments, firmware update instructions 134 may include instructions for transmitting the partial firmware offset from the payment reader 22 to a merchant device 29. For example, after firmware update instructions 134 have determined a partial firmware offset based on a first portion of decompressed firmware update blocks (e.g., a first portion of an incomplete transmission of a firmware update) received by the payment reader 22, processing unit 120 may transmit information associated with the partial firmware offset to the merchant device 29, for example, via the wireless communication interface 108 (e.g., via a Bluetooth low energy interface), wired communication interface 110, or any other suitable communication as described herein.

As is described herein, the partial firmware offset is described as corresponding to uncompressed firmware data stored in memory of the payment reader. In some embodiments, the payment reader may also receive an offset table with the firmware update blocks, which may be used to associate uncompressed firmware offsets with compressed firmware offsets. Based on this offset table and the known uncompressed firmware offset from memory, the payment reader 22 may determine a compressed firmware offset for transmission to the merchant device 29 (e.g., rather than having the offset table stored at the merchant device 29 and the conversion between uncompressed and compressed data performed at the merchant device 29).

In some embodiments, firmware update instructions 134 may include instructions for receiving a second portion of the plurality of compressed firmware update blocks from the merchant device 29 based on the partial firmware offset. Instead of receiving all data contained in the plurality of compressed firmware update blocks available at the merchant device 29, firmware update instructions 134 contain instructions that, when executed by the processing unit 120, allow the payment reader 22 to resume processing of the firmware update based on the partial firmware offset. For example, the second portion of the plurality of compressed firmware update blocks may not include any firmware update blocks that were previously received in their entirety by payment reader 22. In this manner, payment reader 22 may continue updating the firmware from a recent point where the firmware update was properly received, rather than starting over with the firmware update.

In some embodiments, the recent location for the previously received firmware may not correspond to the starting location of any of the compressed firmware blocks. Although in some embodiments the merchant device 29 may truncate the first block of the second portion of compressed firmware update blocks to correspond to the recent stored firmware instructions, in some embodiments the payment reader 22 may need to determine a location of the first block from which to begin the firmware update. In some embodiments, firmware update instructions 134 may include instructions for allowing the payment reader 22 to exchange messages with the merchant device 29 containing information that enables the payment reader 22 to resume receipt of the plurality of compressed firmware update blocks based on the partial firmware offset sent to the merchant device 29. For example, in an embodiment, firmware update instructions 134 may include instructions for the payment reader 22 to disregard data contained in a first block the second portion of the plurality of compressed firmware update blocks from the merchant device 29 that the payment reader 22 has already received and stored in memory, such as memory 122. That is, in some embodiments, firmware update instructions 134 may include instructions allowing the processing unit 120 to use information related to the partial firmware offset (e.g., an uncompressed memory offset of the first data block that corresponds to the partial firmware offset) to identify data in the plurality of compressed firmware update blocks sent by the merchant device 29 for the payment reader 22 to disregard.

In an embodiment, firmware update instructions 134 may include instructions for updating the firmware of the payment reader 22 based on a complete received firmware update. Although any suitable technique for updating the firmware of the payment reader 22 may be performed, in some embodiments, components of the payment reader 22 may be in communication with the processing unit 120 such that it may send data comprising the firmware update to the components as an update to the component's firmware. In an embodiment, updating of a component's firmware may include erasure of existing firmware. In some embodiments, processing unit 120 may execute firmware update instructions 134 to communicate with processors of other components of payment reader 22 (e.g., wireless communication interface 108 and transaction chip 114), including the relevant firmware and a request to update the firmware currently stored in memory.

Firmware update instructions 134 may also include instructions for determining whether it is permissible to process transactions at the payment reader 22 while a firmware update is ongoing. Firmware updates may take a relatively long time as a result of the amount of data that must be downloaded, processed, and stored at the payment reader prior to completing the firmware update. With a plurality of components that may require firmware updates (e.g., from firmware assets associated with each of the plurality of components), the time it takes to update firmware is increased. Moreover, users of a payment reader have different usage patterns. Some users may only use a payment reader 22 occasionally, such that periodic firmware updates might interfere with their normal usage of the payment reader 22 to process payments. Accordingly, firmware update instructions 134 may include instructions that permit payments to be processed at the same time that a firmware update is occurring, under certain circumstances.

In some embodiments, payment reader 22 may receive a parallel processing indicator from the payment server 40 (e.g., from payment service system 50) via the merchant device 29. The parallel processing indicator may be any suitable indicator (e.g., a message, an identifier, a flag, etc.) that informs that payment reader as to whether it is permissible to process payments while a firmware update is occurring. As will be described herein, firmware updates may be configured in a manner such that payment reader 22 may engage in parallel processing of payment transactions and firmware updates. For example, only a limited number of updates ("blocking updates") may be resolving critical issues such as security and payment processing issues, such that processing of payments must stop. As another example, in some instances a payment reader 22 may have a combination of firmware assets (on different components thereof) as a result of infrequent updates, an update that failed to complete, or for other reasons. In any event, if payment reader 22 receives a parallel processing indicator that indicates that payments may be processed, firmware update instructions may inform other processing of payment reader 22 that payments may be processed. If payment reader 22 receives a parallel processing indicator that indicates that payments may not be processed, firmware update instructions may inform other processing of payment reader 22 that payments may not be processed.

Figure 4:
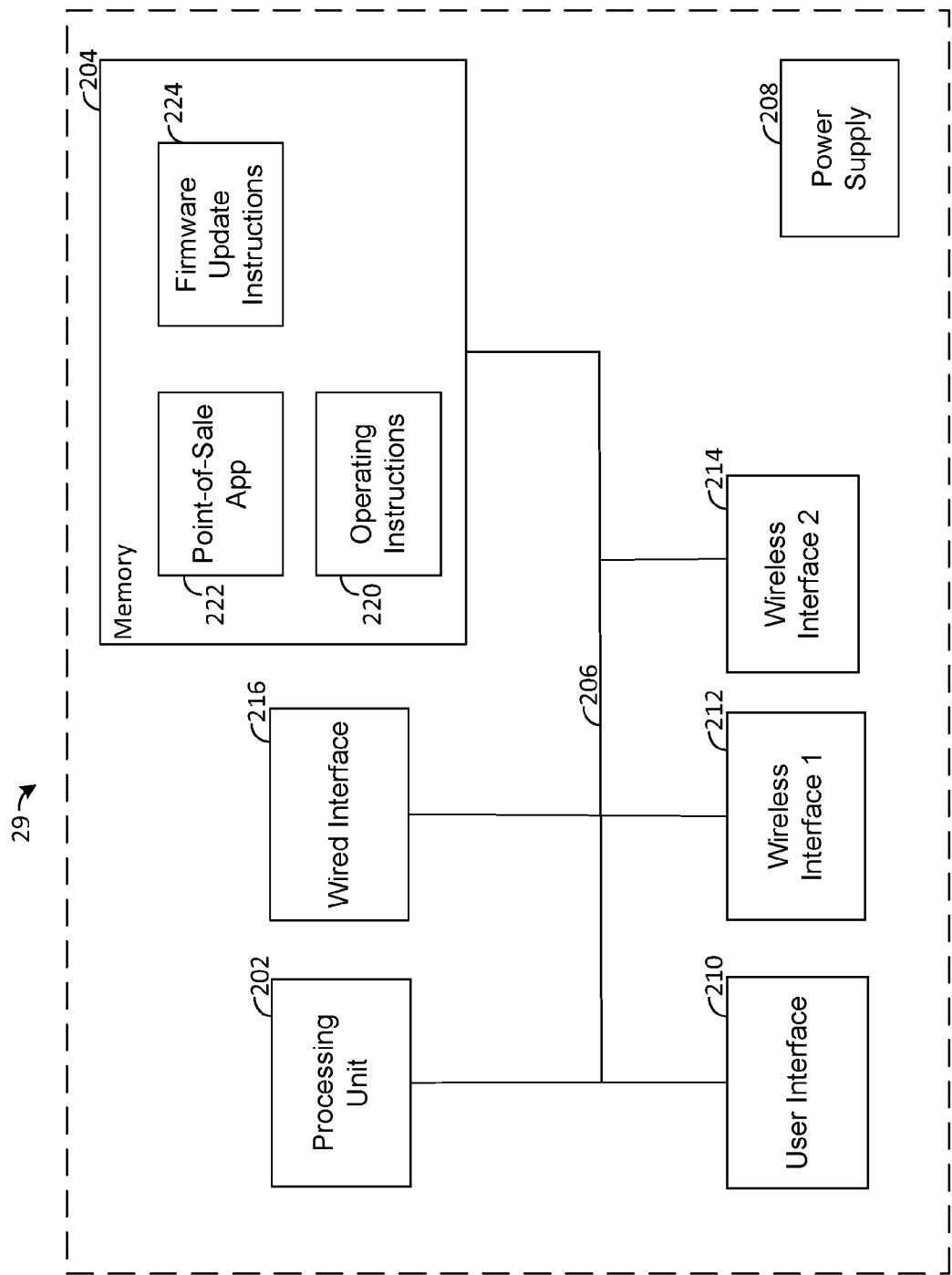
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 of may be a general purpose processor running instructions for a mobile operating system, programs, and applications based on instructions that may be stored in memory 204. The memory 204 may include any suitable memory types or combination thereof as described herein, such as flash memory and RAM memory, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, and firmware update instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse gesture recognition, any other suitable user interface, or any combination thereof. In one embodiment, the user interface 210 may be a touchscreen interface that displays an interactive user interface for programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. In an embodiment, a first wireless communication interface 212 may be a wireless communication interface that primarily communicates with payment reader 22 (e.g., Bluetooth low energy interface) while a second wireless communication interface 214 may be a wireless communication interface (e.g., WiFi) that primarily communicates with a payment service system 50 of payment server 40 (e.g., via the internet).

Merchant device may also include a wired interface 216, which may include any suitable interface for wired communication with other devices or a communication network, such as USB, Lightning, FireWire, Ethernet, any other suitable wired communication interface, or any combination thereof.

Memory 204 may include a plurality of sets of instructions for performing the processing operations of merchant device 29, such as operating instructions 220, point-of-sale application instructions 222, firmware update instructions 224, and any other suitable instructions for operating the merchant device 29 (e.g., instructions related to the operation of one or more other applications or components of the merchant device 29).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface may be controlled in accordance with the instructions of programs and applications of the operating instructions 220, point-of-sale application instructions 222, and the firmware update instructions 224. In one embodiment, the point-of-sale application instructions 222 may include instructions to display information about firmware updates for payment reader 22. Information about firmware updates can include information indicating that a firmware update is required before transactions may be processed, a notification that a firmware update must be performed by a certain time, an interface that allows a user to select firmware updates to provide to payment reader 22, status notifications regarding the process of firmware updates, and any other suitable information regarding a firmware update for the payment reader 22.

Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions may include instructions for providing a rich display of information relating to fraudulent transactions and tamper attempts, and options for selection of corrective action to take in response to fraudulent transactions and tamper attempts.

Firmware update instructions 224 may include any suitable instructions for assisting with updating firmware of the payment reader 22 as described herein, including instructions for receiving requests from a payment server 40 for a firmware manifest from the payment reader 22, receiving a firmware manifest from the merchant device and transmitting the firmware manifest to the server, receiving a plurality of compressed firmware update blocks and an associated offset table from the payment server 40, transmitting the compressed firmware update blocks to the payment reader 22, receiving a partial firmware offset from the payment reader 22, determining a second portion of the plurality of firmware update blocks to send to the payment reader 22 based on the partial firmware offset and the offsets stored in the offset table, and transmitting the second portion of the plurality of compressed firmware update blocks to the payment reader 22.

Firmware update instructions 224 may include instructions for merchant device 29 (or an integrated payment terminal 20) to request a firmware manifest from the payment reader based on a request for the firmware manifest from the payment server 40, a point-of-sale application running on the merchant device 29, or a user input to the point-of-sale application. In some embodiments, the merchant device 29 may receive the firmware manifest and transmit it to the payment server 40 for processing of the firmware manifest.

The merchant device may then communicate with the payment server 40 (e.g., payment service system 50 of payment server 40), which may provide a firmware update and related information to the payment reader. In some embodiments, the firmware update may be provided as a plurality of compressed and encrypted firmware update blocks. In some embodiments, the related information may include an offset table. The compressed firmware update blocks may be been generated by blocks of uncompressed data at the payment server 40, such that the beginning, end, and in some embodiments, intermediate offsets of each uncompressed block can be associated with offsets of the compressed blocks. Based on this offset table, a device such as merchant device 29 or payment reader 22 may receive an offset value for either compressed or uncompressed data, and use that information to find an associated offset for the other data type (uncompressed or compressed, respectively). In this manner, data may be transmitted in compressed form between payment server 40 and merchant device 29, and between merchant device 29 and payment reader 22. The payment reader 22 stores the firmware in uncompressed form, and can use partial offsets from this data to request compressed firmware update blocks, based on the associations of the offset table. In some embodiments, the compressed firmware update blocks and the offset table may be stored at the merchant device 29 after being received from the payment server 40, such that the updating process and offset table lookups may be performed at merchant device 29 based on firmware update instructions 224.

In some embodiments, firmware update instructions 224 may include instructions for the merchant device 29 to send compressed firmware update blocks to the payment reader 22. When the merchant device 29 receives a partial firmware offset from the payment reader 22, firmware update instructions 224 may include instructions for the merchant device 29 to determine a second portion of the plurality of compressed firmware update blocks to send to the payment reader 22. In some embodiments, the firmware update instructions 224 may instruct the merchant device to determine the second portion based on the partial firmware offset from the payment reader 22 using the offset table. In some embodiments, the merchant device 29 may determine the second portion of compressed firmware update blocks by looking up a value in the offset table corresponding to the partial firmware offset from the payment reader 22. For example, in an exemplary embodiment, the offset table may correlate an offset value with the second portion (i.e., a value representing the length the plurality of compressed firmware update blocks that should be sent as the second portion). In some embodiments, firmware update instructions 224 may provide instructions for the merchant device 29 to determine the second portion by matching the partial firmware offset from the payment reader 22 with an offset value in the offset table.

Figure 5:
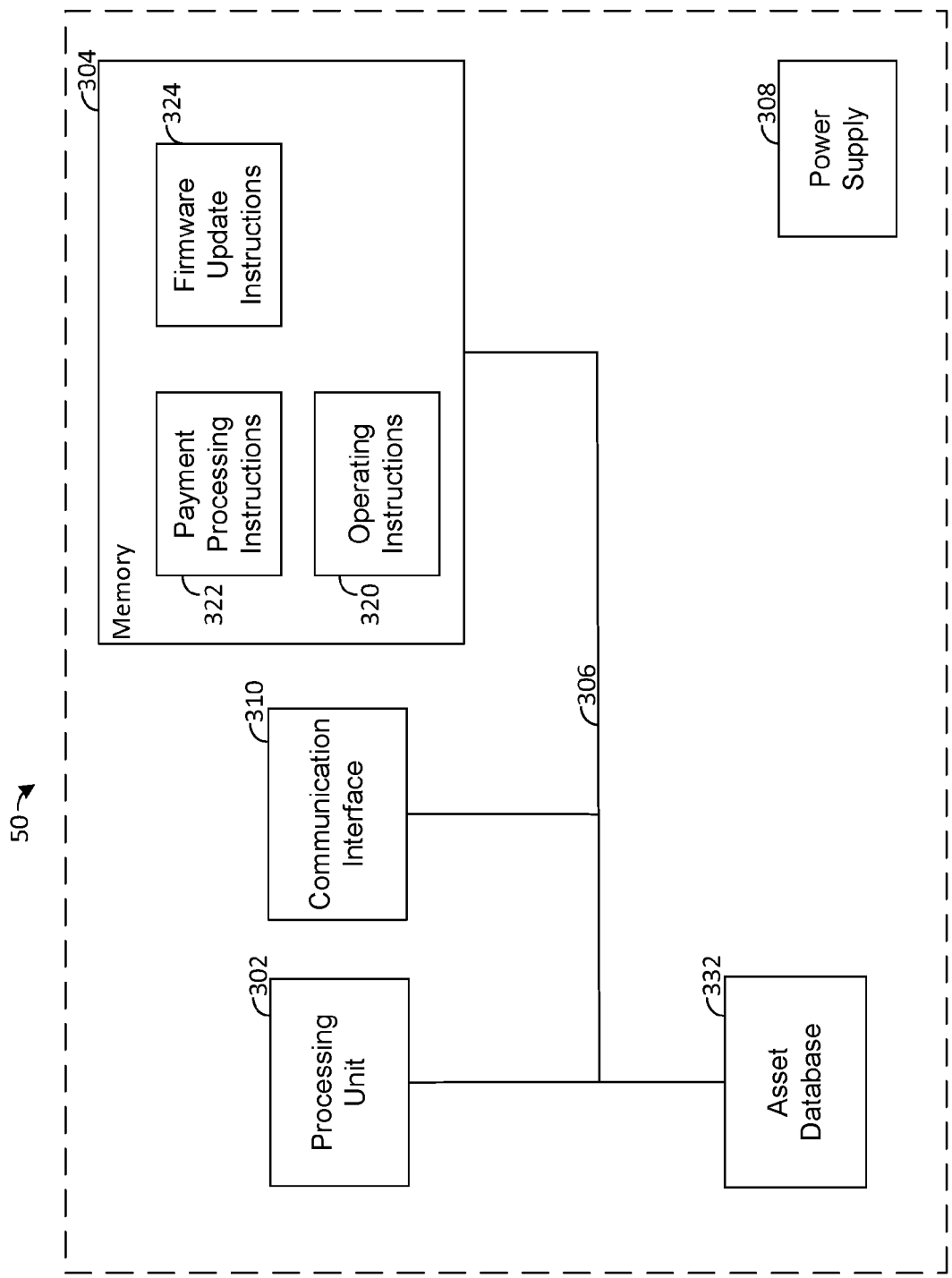
FIG. 5 depicts an illustrative block diagram of a payment service system in accordance with some embodiments of the present disclosure.

FIG. 5 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 5, it will be understood that the payment service system 50 may include additional components, one or more of the components depicted in FIG. 5 may not be included in the payment service system 50, and the components of payment service system 50 may be rearranged in any suitable manner. It will also be understood that, in some embodiments, payment service system 50 may include the necessary components and have the necessary configuration to perform any of the functionality attributed to the payment server 40 herein. In one embodiment, payment service system 50 includes at least a processing unit 302, a memory 304, an interface bus 306, a power supply 308, a communication interface 310, and an asset database 332.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, and firmware update instructions 324.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I²C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 5, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments the communication interface 310 may utilize higher speed communication interfaces such as WiFi, cellular, Ethernet, or fiber optics. The communication interface 310 may establish a secured connection (e.g., via TLS or SSL) with a payment terminal 20 (e.g., payment reader 22 via merchant device 29) in order to exchange messages relating to firmware updates for the payment reader 22 (e.g., firmware manifests, pluralities of firmware update blocks, and offset tables). The communication interface 310 may also communicate with other servers of the payment server 40 such as transaction processing servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application 222. Transaction processing servers may be associated with and operated by one or more of the merchant, issuer, or customer banks.

Memory 304 may include a plurality of sets of instructions for performing the processing operations of the payment service system 50, such as operating instructions 320, payment instructions 322, firmware update instructions 324, and any other suitable instructions for operating the payment service system 50 (e.g., instructions related to the operation of one or more other applications or components of the payment service system 50).

Operating instructions 320 may include instructions for controlling any suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50.

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or transaction processing servers. In one embodiment, the payment processing instructions may include information about each payment reader 22 and merchant device 29 having an installed point-of-sale application 222. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations). Payment processing instructions 322 may also include instructions for accessing encryption keys such as a shared private key or a key of a public/private key pair for encrypting and decrypting data provided by one or more of a payment device 10, payment reader 22, or merchant device 29.

Firmware update instructions 324 may include instructions for providing a firmware update to payment readers 22 (e.g., sending the update to the payment reader 22 via the merchant device 29 and network 30) located that are in communication with the payment service system 50. Although firmware update instructions 324 will be described herein as providing a firmware update to a payment reader 22, it will be understood that these instructions may provide a firmware to any suitable device such as a payment terminal 20, merchant device 29, a wireless communication device, or any other suitable device that requires a firmware update. And while the discussion herein includes processing at both payment service system 50 and merchant device 29, it will be understood that some or all aspects of firmware update instructions 324 may be executed at merchant device 29, and that some or all aspects of firmware update instructions 224 may be executed at payment service system 50.

In some embodiments, thousands or even millions of payment readers or similar devices may be in communication with payment service system 50, and may include firmware that needs to be updated on occasion, for example, to fix software bugs, provide improved functionality, implement new payment standards or changes to existing standards, address security issues, and for many other reasons.

In some embodiments, firmware update instructions 324 may include instructions for receiving information regard firmware (e.g., a firmware manifest) from the payment readers 22. In some embodiments, the payment service system 50 may request the firmware information from payment readers, for example, on a periodic basis to determine if firmware versions are up to date, or after significant updates to firmware updates to one or more components of a payment reader 22. In some embodiments, different versions of payment readers 22 may have different hardware, such that the payment service system 50 may have to maintain different firmware for different devices. In some embodiments, the firmware information (e.g., firmware manifest) may be sent by the payment reader 22 without requiring a request from the payment server, for example, with each payment transaction, on a periodic basis, at each power up, or at any other suitable time.

In some embodiments, firmware update instructions 324 may include instructions for accessing firmware stored at payment service system 50 (e.g., in asset database 332). Asset database 332 may include a large store of information regarding versions of firmware for payment reader 22, and the information stored in asset database 332 may be updated regularly. In some embodiments, there may be many types of payment readers 22, and each type of payment reader 22 may have different components that may have firmware stored in memory. Asset database 332 may include information that firmware update instructions 324 can use to determine whether firmware in memory at payment reader 22 requires updating. In an exemplary embodiment, asset database 332 may include firmware (e.g., uncompressed firmware) that can be extracted using firmware update instructions 324. In an exemplary embodiment, if it is determined based on the firmware manifest using of a particular payment reader 22 that the payment reader requires updating, a firmware update stored in asset database 332 may be accessed by the processing unit 302. The information stored in asset database 332 includes any suitable information such as firmware update locations, firmware versions, software versions, firmware update blocks, payment reader types, and firmware manifest information.

In some embodiments, firmware update instructions 324 may include instructions for determining whether firmware in payment reader 22 requires updating. In some embodiments, firmware update instructions 324 may provide instructions for determining whether firmware in payment reader 22 requires updating by comparing information in a firmware manifest from the payment reader 22 with information about the appropriate firmware for that type of payment reader 22 that is stored in asset database 332. For example, in some embodiments, the payment service system 50 may use firmware update instructions 324 to identify versions of firmware on the payment reader 22 based on the information in the firmware manifest. Payment service system 50 may note the versions of firmware indicated by the firmware manifest and access or otherwise lookup information indicating whether the firmware for that particular payment reader type requires updating. As an example, in some embodiments, the processing unit 302 may access data stored in asset database 332 using firmware update instructions 324 and compare the firmware versions indicated on the firmware manifest with firmware versions for the payment reader 22 stored at asset database 332. In some embodiments, the processing unit 302 may execute firmware update instructions 324 to determine that a firmware update is required when the firmware manifest indicates that firmware stored at the payment reader 22 requires updating (e.g., is a firmware version older than the latest versions for that payment reader 22 stored in asset database 332). Firmware update instructions 324 may be used to identify versions of firmware stored at the payment reader 22 that must be updated, and note the firmware update stored at asset database 332 so that the appropriate firmware update may be sent to payment reader 22.

Although analysis of the data stored at asset database 332 may be performed in any suitable manner, in some embodiments a lookup technique may be used to analyze the data. Payment service system 50 may determine that a firmware update is needed based on a firmware manifest received from the payment reader 22, and accordingly access an appropriate firmware update. Payment service system 50 may similarly update the data stored in asset database 332, based on messages received by the payment service system 50. In some embodiments, payment service system 50 may receive new versions of firmware that will replace versions stored in asset database 332. As an example, payment service system 50 may receive a message that includes a firmware update for a payment reader 22 (e.g., from an entity operating the payment server 40, payment server 50, or payment reader 22). In some embodiments, payment service system 50 may store the new firmware update at asset database 332, which in some embodiments, may include storage of the firmware updates as a set of blocks (e.g., by splitting a firmware update into blocks of predetermined or variable size). Thus, in an exemplary embodiment, payment service system 50 may receive and store in asset database 332 data that represents the latest firmware for payment reader 22, and may update firmware of payment reader 22 accordingly based on the data as described herein.

Firmware update instructions 324 may also include instructions for segmenting the firmware to be transmitted to payment reader 22 into blocks, compressing those blocks, and encrypting the blocks. The plurality of firmware update blocks may be compressed using any suitable compression technique, including lossless, lossy, or other compression methods. In some embodiments, firmware update instructions 324 may include instructions for compressing an entire firmware update so that it may be sent to the payment reader 22 (e.g., via merchant device 29 using network 30). In an embodiment, firmware update instructions 324 may compress the plurality of firmware update blocks into the same number of compressed firmware update blocks that represent an entire firmware update, i.e., with a one-to-one correspondence between the original uncompressed data blocks and the compressed data blocks. In some embodiments, the number of blocks in the plurality of firmware update blocks and compressed firmware update blocks following compression by the firmware update instructions 324 may be the same.

Firmware update instructions 324 may also include instructions for generating the offset table based on a comparison of the locations of data within the original (uncompressed) firmware update blocks and the compressed firmware update blocks, as described herein. The offset table may associate offsets for the beginning and end of each uncompressed block with offsets for its corresponding compressed block, and in some embodiments, may associate numerous locations within the data blocks with each other, such that corresponding data blocks may be identified with more precision (e.g., by a merchant device 29) during firmware updates at the payment reader 22.

In some embodiments, firmware update instructions 324 may include instructions for transmitting the offset table and plurality of compressed firmware update blocks to the merchant device 29. In an exemplary embodiment, the plurality of compressed firmware update blocks and offset table may be transmitted to the merchant device 29 using the communication interface 310 of payment service system 50 via the network 30, but any suitable components of payment service system 50 may be used. In some embodiments, firmware update instructions 324 may include instructions for associating the offset table generated by payment service system 50 with the plurality of compressed firmware update blocks for correlation by the merchant device 29, as described herein.

In some embodiments, firmware update instructions 324 may include instructions for managing a firmware update procedure for payment readers. Although managing a firmware update procedure may include any suitable functionality, in some embodiments, managing a firmware updated procedure may include determining an acceptable update order for particular firmware assets (e.g., for assets associated with particular components and functionality of a payment reader), providing updates in an appropriate manner (e.g., in an appropriate order that avoids providing a combination of firmware to a payment reader 22 that is not operational), and determining whether a payment reader 22 may continue to process payments while a firmware update is occurring (e.g., based on a parallel processing indicator that is provided to payment reader 22).

As described herein, a number of different components may of the payment reader 22 may each have their own firmware, such that each portion of firmware may be updated individually as necessary. However, with a plurality of different reader types, each being updated at different intervals based on usage patterns, and with updates occurring in an ad hoc manner based on the operating conditions of each payment reader (e.g., such that only a subset of firmware updates may be updated during a particular power cycle), it is likely that at any one time there may numerous versions of firmware at numerous payment readers. As described herein, it may be undesirable to prohibit processing of payments by the payment reader 22 during a firmware update, as doing so may result in frequent interruptions to an end user. Accordingly, whenever possible, it may be desirable to allow the payment reader 22 to operate even if the firmware assets at the payment reader 22 are not up to date, as well as if only a subset of firmware assets is up to date.

Although allowing processing of payment transactions when none or only some of the firmware assets of the payment reader 22 are up to date may be desirable, problems may occur based on the interoperability of combinations of the firmware assets. For example, an exemplary payment reader may include firmware assets for each of reader chip 100, the general processing unit 124 of transaction chip 114, the cryptographic processing unit 125 of transaction chip 114, the processing unit 180 of wireless interface 108, FPGA 112, and data authentication instructions 168 (e.g., TMS-CAPK instructions) run by general processing 124 of transaction chip 114. If any combination of these six firmware assets were permitted, this would result in thousands of possible combinations of firmware assets, depending on the number of firmware versions that have been released for these assets. Because payment transactions involve the transfer of highly sensitive financial information, it is not acceptable to have combinations of firmware versions that have not been subject to testing and verification. With thousands of possible combinations, it is impossible to ensure interoperability of a number of firmware versions. Accordingly, firmware update instructions 324 may impart a structure on the firmware updates that allows processing of intermediate firmware states (i.e., updates of some, but not all, firmware assets at a payment reader 22) under most conditions.

Asset database 332 may store a listing of firmware bundles for a plurality of firmware assets. In some embodiments, each firmware bundle may define a particular release of firmware assets. An exemplary firmware bundle may include a version for each of the firmware assets, such that each bundle includes an acceptable release of a combination of firmware assets. When the payment service system 50 receives a firmware manifest from the payment reader, it may compare the firmware versions of the firmware manifest to the firmware versions of the payment reader. If the combination of firmware versions indicated in the firmware manifest corresponds to one of the firmware bundles, the payment reader is operating an acceptable firmware version it is not necessary for firmware update instructions 324 to stop payment processing, except in the case of a blocking bundle.

The firmware update instructions 324 may include instructions for processing firmware updates in the case of a blocking bundle (e.g., a bundle stored in the asset database 332 that has an indicator that it is blocking). As described herein, certain firmware updates may include updates to critical functionality such as security or payment processing functionality. Such critical updates may be such that a payment reader should not be permitted to process the update until the firmware update of the critical firmware is complete. In some embodiments, a blocking update may apply to an entire bundle, such that processing of payments may not continue (e.g., the payment service system 50 may not process payments from the payment reader 22 and may send a parallel processing indicator to the payment reader 22 indicating that it should stop processing payments) until the entire bundle is updated at the payment reader. In some embodiments, a subset of the firmware assets within a bundle may be indicated as blocking firmware assets, such that processing of payments may resume once that subset of firmware assets is updated.

The firmware update instructions 324 may include instructions for enforcing ordered firmware updates, based for example on the ordering of the firmware assets within the bundles. Each bundle may be ordered, with the ordering based on the firmware asset type (i.e., the component of the payment reader 22 that a firmware asset is associated with). The ordering of the firmware assets within the firmware bundle may signify a priority for each firmware asset, such that the firmware update instructions 324 may cause the payment service system to send the highest priority firmware asset to the payment reader 22 first, and so on, through to the lowest priority firmware asset which is only provided to the payment reader 22 after all of the other firmware assets have been updated. This ordering may enforce a limited subset of allowable intermediate states between bundles. An exemplary allowable intermediate state for a payment reader 22 may be a condition where it has been partially updated between two bundles in the proper order, as required by the ordering of the bundle. For example, in an embodiment of an exemplary payment reader 22, the firmware assets may be ordered as follows in the bundles, with (1) having the highest priority and (6) the lowest priority:

(1) Firmware for the reader chip 100,
(2) Firmware for the general processing unit 124 of transaction chip 114,
(3) Firmware for the cryptographic processing unit 125 of transaction chip 114,
(4) Firmware for the processing unit 180 of wireless interface 108,
(5) Firmware for interfacing with FPGA 112, and
(6) Firmware for data authentication instructions 168 (e.g., TMS-CAPK instructions) run by general processing unit 124 of transaction chip 114.

In the example above, whenever an update to a new bundle is required, the firmware for (1) will be updated first. Once that update is complete, the firmware for (2) will be updated, and so on, until all of (1) through (6) are updated at the payment reader to the version of the firmware asset indicated in the firmware bundle.

As described herein, in some embodiments a firmware update may be interrupted such that only some of the assets of a firmware bundle have been updated at the payment reader. The next time that the payment reader 22 provides its firmware manifest to the payment service system 50, the payment service system may determine that the payment reader 22 firmware is in a transition state between bundles, based on firmware update instructions 324. If the bundles have been provided according to the enforced ordering (e.g., in the order (1)-(6) in the example above), this transition state may be an allowable state for the payment reader to continue processing payment transactions (e.g., assuming the next bundle is not a blocking bundle) while finishing its updating of the firmware assets to conform to the next firmware bundle. Ordering requires that there are only a limited number of ways of transitioning between two bundles, thus limiting the number of combinations of firmware versions that must be proven to be operational. Accordingly, it is possible to verify that each transition state is a state in which it is acceptable for the payment reader to process transactions.

If a payment reader 22 provides a firmware manifest in which the firmware does not conform to a firmware bundle or a transition state (i.e., according to the required ordering enforced by the order of the assets in the bundle), the firmware of the payment reader 22 may be determined to be in a non-conforming state, such that no processing may occur until all of the firmware of the payment reader 22 has been updated to the latest bundle, based on the firmware update instructions.

Based on the bundles, blocking updates, transition states, and non-conforming states, the firmware update instructions may select a bundle for an update and provide a parallel processing indicator to the payment reader 22, based on the firmware update instructions 324. As described herein, payment processing system 50 may receive a firmware manifest from the payment reader 22. Payment processing system 50 may also include an asset database 332 that includes a listing of allowable bundles. Payment processing system 50 may first identify whether the firmware versions of the firmware manifest correspond to a firmware bundle or a transition state. If not, the payment reader 22 is in a non-conforming state and a message (e.g., the parallel processing indicator) will be sent to the payment reader 22 to stop processing payment transactions. If the current state corresponds to a firmware bundle or a transition state, processing may continue at the payment reader 22 as long as there is not a subsequent blocking bundle in the asset database. If there is a subsequent blocking bundle, a message (e.g., the parallel processing indicator) will be sent to the payment reader 22 to stop processing payment transactions.

Firmware update instructions 324 also include instructions for selecting the next bundle of firmware to provide to the payment reader 22. If a subsequent bundle is a blocking bundle, it is necessary to update firmware to the most recent blocking bundle. Because processing of payment transactions may not occur until this blocking update is completed, the next update may update directly to the most recent blocking update. If there are also later non-blocking updates after the most recent blocking updates, in some embodiments, the next update may update immediately to the most recent bundle. In embodiments where the payment reader firmware corresponds to a bundle or a transition state, and wherein there is not a subsequent blocking update, the transition may be to the next bundle in the sequence of bundles, such that if a firmware update is not completed for all bundles the payment reader 22 may remain in a transition state that permits payments during the firmware update process.

Figure 6:
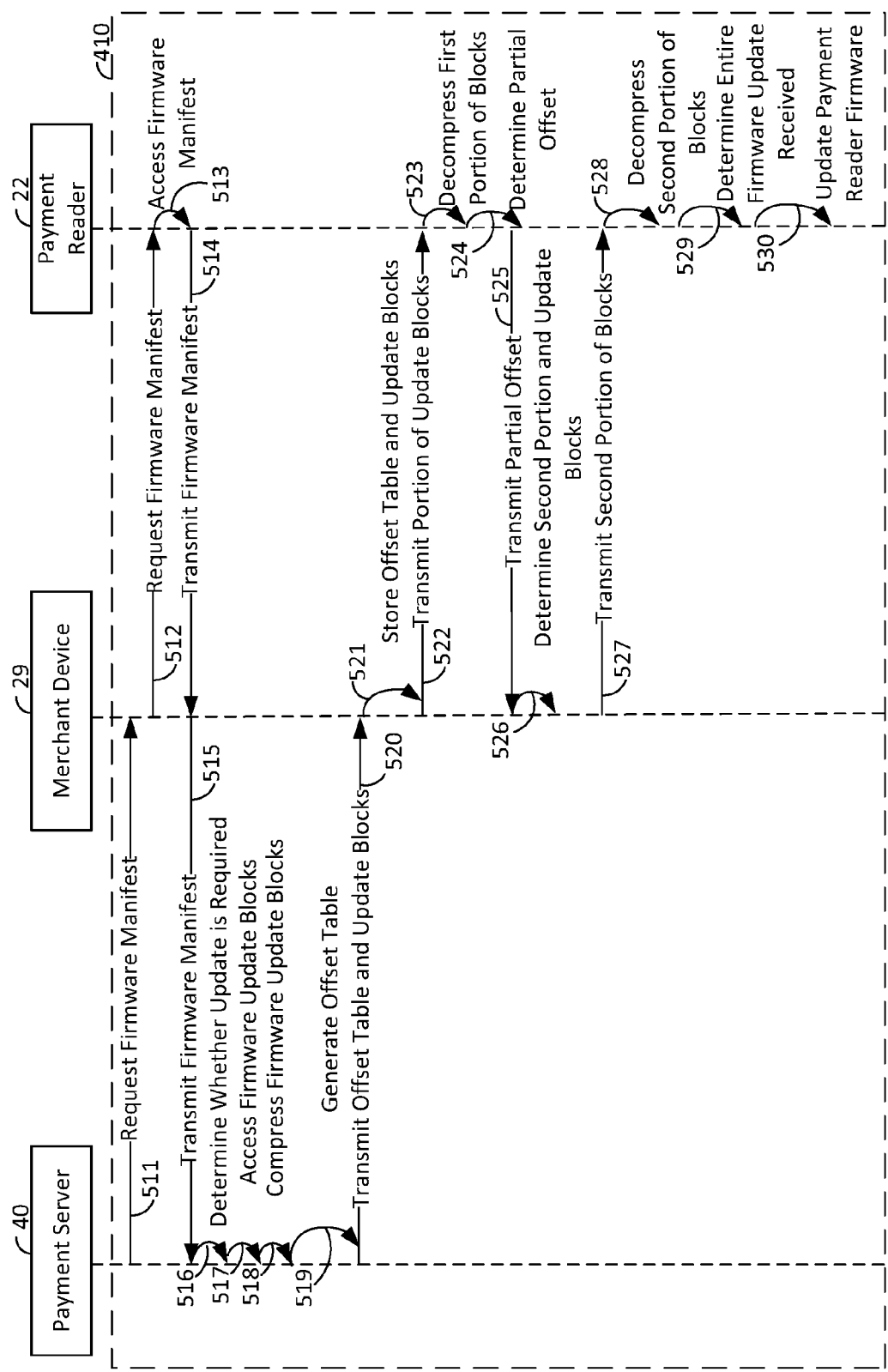
FIG. 6 depicts a non-limiting flow diagram illustrating exemplary methods for updating compressed firmware of a payment reader in accordance with some embodiments of the present disclosure.
Figure 7:
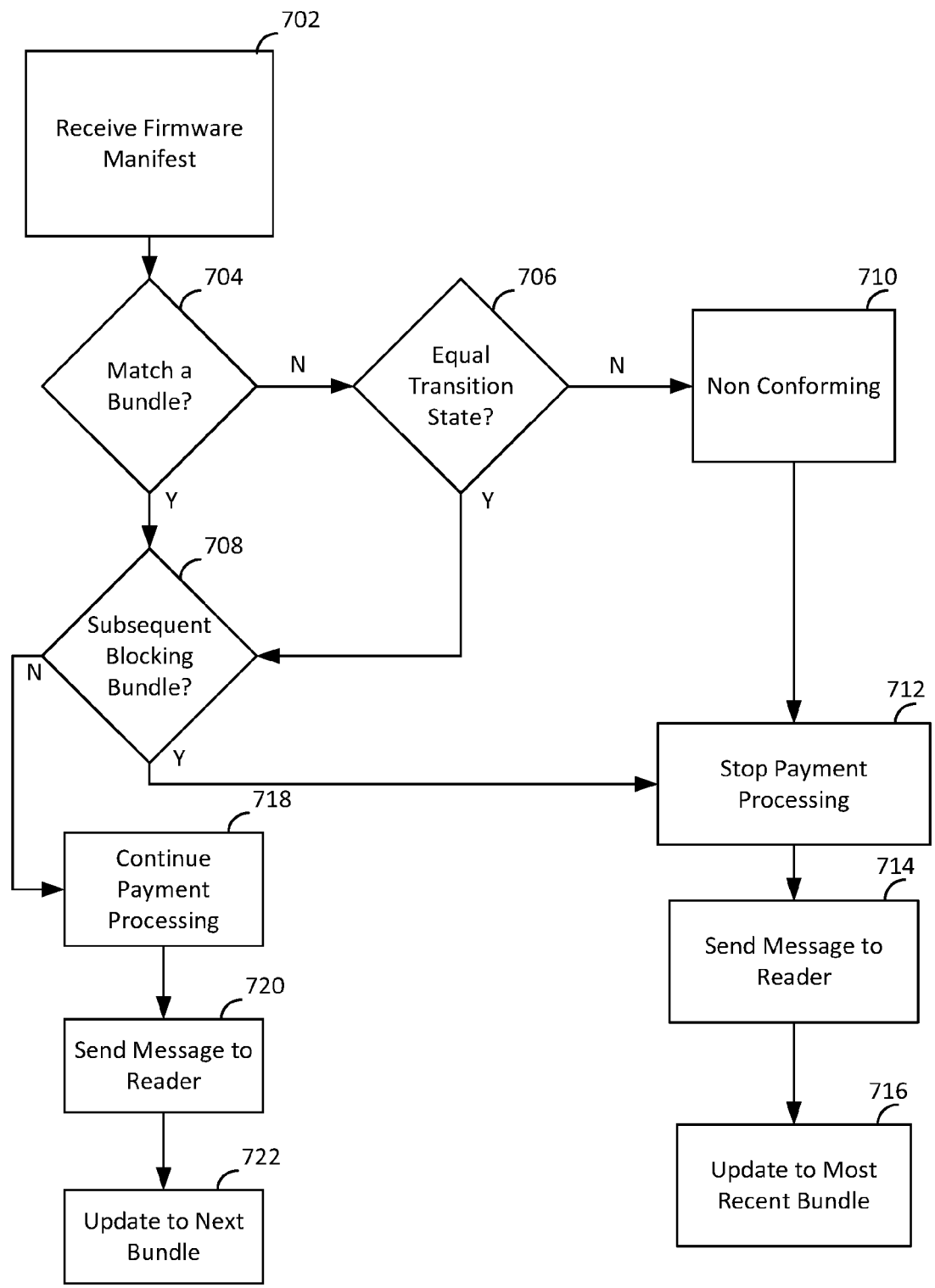
FIG. 7 depicts a non-limiting flow diagram illustrating exemplary methods for determining firmware to provide to a payment reader in accordance with some embodiments of the present disclosure.
Figure 8:
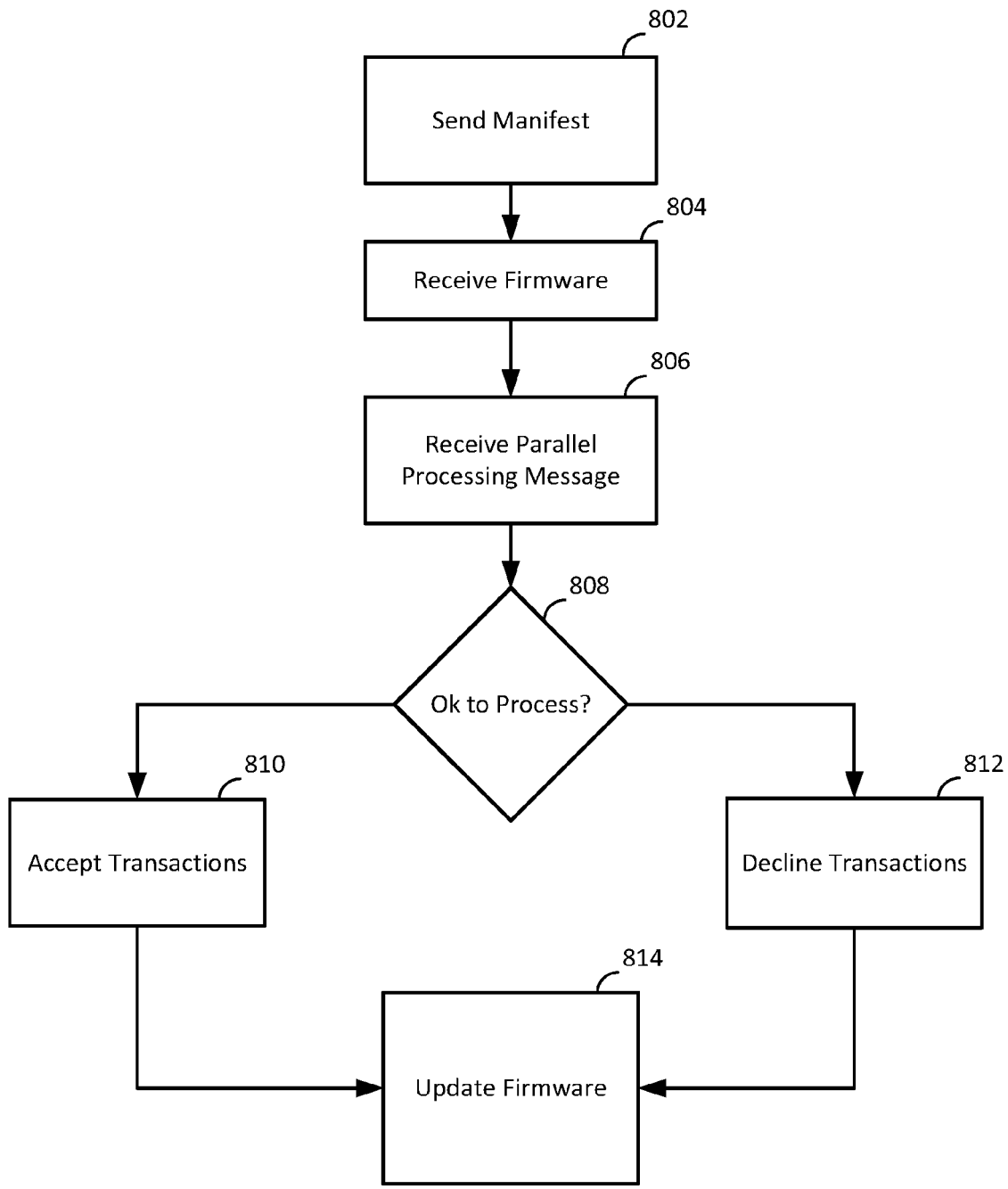
FIG. 8 depicts a non-limiting flow diagram illustrating exemplary methods for updating firmware at a wireless communication device in accordance with some embodiments of the present disclosure.

In view of the structures and devices described supra, methods that can be implemented in accordance with the disclosed subject matter will be better appreciated with reference to the flowcharts of FIGS. 6-8. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts a data flow 410 for providing a firmware update to a payment reader 22 of a payment system in accordance with some embodiments of the present disclosure. In one embodiment, as is depicted in FIG. 6, steps 400 are performed by a payment terminal device such as a payment reader 22, a merchant device 29, and payment server 40 (i.e., by payment service system 50). Although these steps are described as being performed by particular devices in one embodiment, it will be understood that the allocation of the steps between the devices may be modified in any suitable manner or that the number of devices performing the steps may be modified in any suitable manner.

At step 511, payment server 40 may send a request to merchant device 29 for a firmware manifest from payment reader 22, as described herein with reference to FIG. 5. More specifically, the payment service system 50 may require the firmware information from payment readers 22, for example, on a periodic basis to determine whether firmware versions are up to date, or after significant updates to firmware updates to one or more components of a payment reader 22. The request at step 511 may be sent via network 30 in some embodiments, but any suitable means of communicating the request may be used. At step 512, merchant device 29 may receive the request, such as from the payment server 40, a point-of-sale application running on the merchant device 29, or a user input to the point-of-sale application, and forward the request to payment reader 22. In some embodiments, payment server 40 may send the request to payment terminal 20, as described with reference to FIG. 2.

At step 513, payment reader 22 may request information from components of payment reader 22 about firmware stored in memory of the component, which may include information that may be used to identify firmware information, such as firmware version, firmware name, hash value, CRC, section of code, or any other suitable method for identifying the firmware. Payment reader 22 may then generate a firmware manifest at step 513 in response to the request received at step 512. In some embodiments, the firmware manifest generated at step 513 may include information about firmware stored in memory of any of the components of payment reader 22, such as wireless interface 108 (e.g., wireless firmware), reader chip 110 (e.g., operating firmware), signal conditioning instructions 170 of transaction chip 114 (e.g., signal conditioning firmware), data authentication instructions 168 of transaction chip 114 (e.g., data authentication firmware), firmware of general memory 126 of transaction chip 114 (e.g., transaction firmware), and firmware of a cryptographic memory of transaction chip 114 (e.g., cryptographic firmware). As described with reference to FIG. 3 herein, payment reader 22 may process the information for transmission in response to a request received from payment server 40. At step 514, the payment reader may transmit the firmware manifest to the merchant device 29, such as via wireless interface 108 or wired interface 110 or in any other suitable manner. In other embodiments, payment reader 22 may generate and transmit a firmware manifest to the merchant device 29 without requiring a request from the payment server 40. The merchant device 29 may then transmit the firmware manifest to the payment server at step 515, for example, using the network 30.

At step 516, payment server 40 may determine whether firmware of the payment reader 22 requires updating based on the firmware manifest. In some embodiments, the determination at step 516 may be performed by comparing information in a firmware manifest from the payment reader 22 with information about the appropriate firmware for that type of payment reader 22 that is stored in asset database 332. As noted with reference to FIG. 5, the payment server 40 may use firmware update instructions 324 to identify versions of firmware on the payment reader 22 based on the information in the firmware manifest. Payment server 40 may note the versions of firmware indicated by the firmware manifest and access or otherwise lookup information indicating whether the firmware for that particular payment reader type requires updating. In some embodiments, at step 516, the payment server 40 may determine that a firmware update is required when the firmware manifest indicates that firmware stored at the payment reader 22 requires updating (e.g., is a firmware version older than the latest versions for that payment reader 22 stored in asset database 332). In some embodiments, payment server 40 may take no action if it determines that no firmware update is required based on the firmware manifest. In some embodiments, payment server 40 may determine that, based on the firmware manifest, firmware of the payment reader 22 needs to be updated, and may access a plurality of firmware update blocks (e.g., firmware updates split into blocks of predetermined or variable size and stored at asset database 332) at step 517. In some embodiments, the firmware update blocks accessed at step 517 may be the latest firmware for payment reader 22, as discussed with reference to FIG. 5.

At step 518, payment server 40 may segment, compress, and encrypt the firmware to be transmitted to payment reader 22 and accessed at step 517 into a plurality of firmware update blocks. The compression may be any suitable method for compressing data, such as is discussed with reference to FIG. 5. In an embodiment, compression performed at step 518 may be compression of the plurality of firmware update blocks into the same number of compressed firmware update blocks that represent an entire firmware update, i.e., with a one-to-one correspondence between the original uncompressed data blocks and the compressed data blocks. At step 519, payment server 40 may generate an offset table associated with the plurality of compressed firmware update blocks, as described herein. Specifically, the offset table generated at step 619 may be generated based on a comparison of the locations of data within the original (uncompressed) firmware update blocks (i.e., as the blocks are stored at asset database 332) and the compressed firmware update blocks, as described herein. As noted with reference to FIG. 5, the offset table may associate offsets for the beginning and end of each uncompressed block with offsets for its corresponding compressed block, and in some embodiments, may associate numerous locations within the data blocks with each other, such that corresponding data blocks may be identified with more precision (e.g., by a merchant device 29) during firmware updates at the payment reader 22.

At step 520, payment server 40 may transmit the offset table and plurality of compressed firmware update blocks to merchant device 29, for example, via network 30 using communication interface 310. As noted herein, in some embodiments, the firmware update may be provided as a plurality of compressed and encrypted firmware update blocks, and a compressed and encrypted offset table. When merchant device 29 receives the offset table and plurality of compressed firmware update blocks from payment server 40, it may store them in memory of the merchant device 29 at step 521. In some embodiments, the compressed firmware update blocks and the offset table may be stored at the merchant device 29 after being received from the payment server 40, such that the updating process and offset table lookups may be performed at merchant device 29.

Merchant device 29 may begin sending the plurality of compressed firmware update blocks to the payment reader 22 by transmitting a first portion of the plurality of compressed firmware update blocks to the payment reader 22 at step 522. At step 523, the payment reader 22 may have received and decompressed the first portion. As noted with reference to FIG. 3 herein, decryption and decompression may be performed in any suitable manner based on any suitable encryption and compression methods, in some embodiments encryption may include public-key encryption methods (e.g., Triple DES, RSA) or symmetric-key encryption methods (e.g., Blowfish, Twofish or Advanced Encryption Standard (AES)), while compression algorithms may include lossy compression (e.g., JPEG or MPEG algorithms) or lossless compression (e.g. PNG, or GIF algorithms). In some embodiments, payment reader 22 may store the decompressed first portion in memory of the payment reader 22 (e.g., flash memory) and determine a partial firmware offset at step 524 based on a check of memory of the payment reader 22. In some embodiments, the determination at step 524 may include determining how much of the firmware update has been received. The determination may be performed in any suitable manner that may determine an amount of firmware that has been successfully received, for example, by identifying a last or recent firmware instruction that was successfully received and identifying an offset associated with that instruction. In some embodiments where the firmware is decompressed before being stored in memory, this offset may correspond to an uncompressed firmware offset, and memory storing the received and decompressed firmware update may include locations including calculated cyclic redundancy check (CRC) values. An uncompressed firmware offset may be identified based on portions of memory where the CRC value is correct. As described with reference to FIG. 3, the most recent firmware instruction that is associated with a good CRC value may be selected to determine the uncompressed firmware offset. In some embodiments, the total number of firmware instructions prior to this most recent instruction may be used as the value, which may function as a partial firmware offset. The partial firmware offset may be used to determine the next block of firmware to transmit to transmit to the payment reader 22.

At step 525, the payment reader 22 may transmit the partial firmware offset, such as to the merchant device 29, in order to enable the merchant device 29 to determine a second portion of the plurality of compressed firmware update blocks to send to the payment reader 22. Based on the offset table, the merchant device 29 may receive an offset value for either compressed or uncompressed data, and use that information to find an associated offset for the other data type (uncompressed or compressed, respectively). At step 526, the merchant device 29 may determine the a second portion of the plurality of compressed firmware update blocks based on the offset table associated with the compressed firmware update blocks and the known uncompressed firmware offset from the payment reader 22. In some embodiments, the merchant device 29 may reach a determination at step 526 and identify the second portion of compressed firmware update blocks for transmission to the payment reader 22. In an embodiment, the payment reader 22 may disregard data contained in a first block of the second portion of the plurality of compressed firmware update blocks from the merchant device 29 that the payment reader 22 has already received and stored in memory, such as memory 122. The partial firmware offset (e.g., an uncompressed memory offset of the first data block that corresponds to the partial firmware offset) may be used to identify data in the plurality of compressed firmware update blocks sent by the merchant device 29 for the payment reader 22 to disregard. In this manner, payment reader 22 may continue updating the firmware from a recent point where the firmware update was properly received, rather than starting over with the firmware update. At step 527, the merchant device 29 may transmit a second portion of the plurality of firmware update blocks to payment reader 22, as described herein with reference to FIG. 4.

The payment reader 22 may receive the second portion transmitted at step 527. In an embodiment, the payment reader 22 may disregard data contained in a first block of the second portion of the plurality of compressed firmware update blocks from the merchant device 29 that the payment reader 22 has already received and stored in memory, such as memory 122. The partial firmware offset (e.g., an uncompressed memory offset of the first data block that corresponds to the partial firmware offset) may be used to identify data in the plurality of compressed firmware update blocks sent by the merchant device 29 for the payment reader 22 to disregard. In this manner, payment reader 22 may continue updating the firmware from a recent point where the firmware update was properly received, rather than starting over with the firmware update. At step 528, the payment reader 22 may decrypt and decompress the second portion of the plurality of compressed firmware update blocks, such as is described herein with reference to FIG. 3. In some embodiments, the payment reader 22 may store the decompressed second portion in memory of the payment reader 22 (e.g., in RAM) and perform a check of the memory of the various components of payment reader 22, such as is described with reference to FIG. 3, and continue to step 529.

At step 529, the payment reader 22 may determine that the entire firmware update has been received based at least on the decompressed first and second portions. In some embodiments, the payment reader 22 may determine that the entire firmware update has been received based on its check of its memory. In some embodiments, the determining at step 529 may be performed by the payment reader 22 by comparing an amount of firmware data stored in the memory (e.g., as a result of the decompressed first and second portions of the plurality of compressed firmware update blocks) at the payment reader 22 with an amount of data associated with the entire firmware update sent from the payment server 40. In some embodiments, the payment reader 22 may determine based on this comparison that the entire firmware update has been received.

At step 530, the payment reader 22 may update the firmware of the payment reader based on the complete received firmware update. In an embodiment, payment reader 22 may store the first and second portion of the plurality of firmware update blocks in memory until it determines that the entire firmware update has been received at step 529. Processing unit 120 may communicate with processors of other components of payment reader 22 (e.g., wireless communication interface 108 and transaction chip 114), including the relevant firmware and a request to update the firmware currently stored in memory. In some embodiments, the payment reader 22 may then update the firmware for the appropriate component based on the received firmware update. Thereafter, the data flow 410 may end.

FIG. 7 depicts a non-limiting flow diagram illustrating exemplary methods for determining firmware to provide to a wireless communication device in accordance with some embodiments of the present disclosure. Although it will be understood that any suitable device may determine firmware to provide to a wireless communication device, in an exemplary embodiment the determination may be made at a payment service system 50 of payment server 40, the wireless communication device may be a payment reader 22, and the firmware update may be provided to the payment reader 22 via a network 30 and via merchant device 29.

At step 702, payment service system 50 may receive a firmware manifest listing firmware versions that are stored at one or more components of payment reader 22, based on processing unit 302 executing firmware update instructions 324. Although the firmware manifest may include any suitable information, in some embodiments the firmware manifest may identify each firmware asset that is operational at the payment reader (e.g., six firmware assets as described herein) and a version associated with each of those assets. Once the firmware manifest has been received, processing may continue to step 704.

At step 704, payment service system 50 may determine whether the firmware versions of the received firmware manifest match a known bundle, based on processing unit 302 executing firmware update instructions 324 and accessing information relating to bundles (e.g., from asset database 332). As described herein, a bundle may represent a listing of hierarchically ordered groupings of firmware versions that are available or have previously been made available for payment readers. If the versions of the firmware manifest match a bundle, processing may continue to step 708. If the versions of the firmware manifest do not match a bundle, processing may continue to step 706.

At step 706, payment service system 50 may determine whether the firmware versions of the received firmware correspond to an acceptable transition state, based on processing unit 302 executing firmware update instructions 324 and accessing information relating to bundles (e.g., from asset database 332). As described herein, because each bundle represents an order in which firmware assets may be updated, acceptable transitions states between bundles (e.g., updating to a newer bundle) may exist in which some of those versions have been updated in the correct order. Such a transition may be acceptable for continuing payment processing. On the other hand, if the firmware versions of the firmware manifest are not in an acceptable transition state (e.g., the firmware versions are between bundles but have not been updated in the correct order), it is likely that this is an untested state and payment transaction should not be processed. If the versions of the firmware manifest are in an acceptable transition state, processing may continue to step 708. If the versions of the firmware update are not in an acceptable transition state, processing may continue to step 710.

At step 708, payment service system 50 may determine whether there exists a subsequent blocking bundle (e.g., a bundle including later available firmware versions that has been marked as a blocking bundle of firmware versions), based on processing unit 302 executing firmware update instructions 324 and accessing information relating to bundles (e.g., from asset database 332). As described herein, a blocking bundle may represent a critical update that must be made prior to the payment reader 22 continuing payment transactions. If there is a subsequent bundle that is a blocking bundle, processing may continue to step 712. If there is not a subsequent bundle that is a blocking bundle, processing may continue to step 718.

At step 710, payment service system 50 may mark the firmware associated with the payment reader as non-conforming, based on processing unit 302 executing firmware update instructions 324. As described herein, non-conforming firmware versions may be firmware versions of a firmware manifest that neither match a bundle nor an acceptable transition state. Processing may then continue to step 712.

At step 712, payment service system 50 may stop payment processing at the payment service system 50 of payments from the payment reader 22 that sent the firmware manifest, based on processing unit 302 executing firmware update instructions 324. Processing may arrive at step 712 based on either the firmware versions of the manifest being non-conforming (steps 706 and 710) or if a subsequent blocking bundle was identified (step 708). If processing arrives at step 712, payment processing instructions may not be executed for payment transactions initiated by that particular payment reader 22. Processing may then continue to step 714.

At step 714, payment service system 50 may send a parallel processing indicator to the payment reader 22 and/or the merchant device 29 associated with payment reader 22, indicating that payment reader 22 should not process transactions in parallel with updating firmware, based on processing unit 302 executing firmware update instructions 324. Based on such an indicator, the payment reader 22 may stop processing of transactions, and in some embodiments, may attempt to limit other processing and maintain a wireless connection in order to expedite processing of the firmware update. In a similar manner, merchant device 29 may provide an indication or warning to a merchant or user, indicating that a firmware update is required before payment processing may continue and providing other information such as the progress of the firmware update. Processing may then continue to step 716.

At step 716, payment service system 50 may update the payment reader 22 to a new bundle, based on processing unit 302 executing firmware update instructions 324. Although it may be possible to select other bundles, in some embodiments the firmware may be updated to the most recent bundle, or to the most recent blocking bundle. In this manner, because a significant number of firmware assets of the payment reader may need to be updated in any event, it may be desirable to update to a most recent version. Whichever firmware assets are provided with the update, they may be provided to the payment reader 22 for updating (e.g., via merchant device 29) as described herein.

If processing of payment transactions may continue (e.g., if the firmware of the payment reader is not non-conforming or if there are no blocking bundles), processing may continue to step 718 (e.g., from step 708) such that payment transactions may continue to be processed by payment service system 50, based on processing unit 302 executing firmware update instructions 324. In this manner, payment service system 50 may continue to process transactions from the payment reader 22 even though it is continuing to provide a firmware update to the payment reader 22. Processing may then continue to step 720.

At step 720, payment service system 50 may send a parallel processing indicator to the payment reader 22 and/or the merchant device 29 associated with payment reader 22, indicating that payment reader 22 may continue to process transactions in parallel with updating firmware, based on processing unit 302 executing firmware update instructions 324. Based on such an indicator, the payment reader 22 and merchant device 29 may continue processing of transactions, with the firmware update occurring in the background, as described herein. Processing may then continue to step 716.

At step 722, payment service system 50 may update the payment reader 22 to a new bundle, based on processing unit 302 executing firmware update instructions 324. Although it may be possible to select other bundles, in some embodiments the firmware may be updated to next available bundle. In this manner, it may only be required to update a limited number of firmware assets with any one update, and the update may occur in the background while payments continue to be processed. For example, particular assets to be updated may be provided to merchant device 29 as described herein. In some embodiments, those updates may be transmitted to payment reader 22 one at a time. Once the complete update for the asset is received, the payment reader may update the particular asset at an appropriate point in time (e.g., on a reboot of the payment reader 22 or after a period of inactivity). This processing may be repeated until all of the assets are updated. Once the payment reader has been updated to the new bundle, processing may end.

FIG. 8 depicts a non-limiting flow diagram illustrating exemplary steps for updating a firmware at a wireless communication device in accordance with some embodiments of the present disclosure. Although it will be understood that any suitable wireless communication device may be updated, in an exemplary embodiment the wireless communication device may be a payment reader 22.

At step 802, payment reader 22 may send a firmware manifest listing firmware versions that are stored at one or more components of payment reader 22, based on processing unit 120 executing firmware update instructions 134. Although the firmware manifest may include any suitable information, in some embodiments the firmware manifest may identify each firmware asset that is operational at the payment reader (e.g., six firmware assets as described herein) and a version associated with each of those assets. Once the firmware manifest has been sent, processing may continue to step 804.

At step 804, payment reader 22 may receive firmware to update for a firmware asset stored at payment reader 22, based on processing unit 120 executing firmware update instructions 134. As described herein, a plurality of firmware assets may be associated with different components or functionality of payment reader 22, such that each asset may be received and updated individually. Once a complete firmware update for a firmware asset is received, processing may continue to step 806.

At step 806, payment reader 22 may receive a parallel processing indicator, indicating whether payment reader 22 may continue to process transactions in parallel with updating firmware, based on processing unit 120 executing firmware update instructions 134. Once the parallel processing indicator is received, processing may continue to step 808.

At step 808, payment reader 22 may determine whether to continue processing payment transactions based on the received a parallel processing indicator, based on processing unit 120 executing firmware update instructions 134. If transactions may continue to be processed, processing may continue to step 810. If transactions may not continue to be processed, processing may continue to step 812.

At step 810, payment reader 22 may process transactions (e.g., with payment service system 50 via merchant device 29) as described herein, based on processing unit 120 executing transaction processing instructions 132 and firmware update instructions 134. The firmware update may occur in the background, as described herein. Processing may then continue to step 814.

At step 812, payment reader 22 may decline payment transactions, based on processing unit 120 executing firmware update instructions 134. The payment reader 22 may stop processing of transactions, and in some embodiments, may attempt to limit other processing and maintain a wireless connection in order to expedite processing of the firmware update. In a similar manner, merchant device 29 may provide an indication or warning to a merchant or user, indicating that a firmware update is required before payment processing may continue and providing other information such as the progress of the firmware update. Processing may then continue to step 814.

At step 814, payment reader 22 may update the received firmware, based on based on processing unit 120 executing firmware update instructions 134. If transactions are being processed, such an update may occur in the background, as described herein. If transactions are not being processed, the update may be required to be completed prior to any transactions occurring. For example, particular assets to be updated may be provided to merchant device 29 as described herein. In some embodiments, those updates may be transmitted to payment reader 22 one at a time. Once the complete update for the asset is received, the payment reader may update the particular asset at an appropriate point in time (e.g., on a reboot of the payment reader 22 or after a period of inactivity if payment processing is to continue, or immediately if transactions are blocked). Once the payment reader has been updated to the new bundle, processing may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method of providing a firmware update from a payment server to a payment reader, the method comprising:
    requesting, from a merchant device running a point-of-sale application, a firmware manifest from the payment reader;
    accessing, at the payment reader, the firmware manifest, wherein the firmware manifest includes a firmware version for each of a plurality of firmware assets, and wherein each firmware asset includes instructions for operating a component of the payment reader;

transmitting, from the payment reader via the merchant device, the firmware manifest to the payment server;
accessing, at the payment server, a plurality of firmware bundles, wherein each firmware bundle comprises an ordered listing of permitted combinations of firmware versions for the plurality of firmware assets;
determining, at the payment server, whether the firmware versions of the firmware manifest are a permissible combination of firmware versions, comprising:
comparing an ordered listing of the firmware versions of the firmware manifest to one or more of the firmware bundles;
identifying the firmware versions of the firmware manifest as a permissible combination if the ordered listing for the firmware manifest matches one of the firmware bundles; and
identifying the firmware versions of the firmware manifest as a permissible combination if the ordered listing for the firmware manifest corresponds to a transition state between two firmware bundles;
identifying, at the payment server, a firmware update for one of the firmware assets, wherein identifying the firmware update comprises:
identifying an update firmware bundle of the plurality of firmware bundles;
comparing, in order, firmware versions of the ordered listing for the firmware manifest to corresponding firmware versions for the update firmware bundle; and
identifying the firmware update based on the first firmware version of the ordered listing for the firmware manifest that does not match the corresponding firmware version of the update firmware bundle;
generating, at the payment server, a parallel processing indicator;
transmitting, from the payment server, the firmware update and the parallel processing indicator;
receiving, at the payment reader via the merchant device, the firmware update and the parallel processing indicator;
receiving, at the payment reader, a request to process a payment;
processing the payment at the payment reader if the parallel processing indicator indicates that the payments may be processed during the firmware update;
updating, at the payment reader, the firmware asset that is associated with the firmware update.

2. The method of claim 1, wherein identifying an update firmware bundle of the plurality of firmware bundles comprises:
determining whether a subsequent blocking firmware bundle exists;
identifying the subsequent blocking firmware bundle as the update firmware bundle if the subsequent blocking bundle exists;
identifying the next firmware bundle as the update firmware bundle if no subsequent blocking bundle exists.

3. The method of claim 1, wherein the parallel processing indicator is indicative that the update firmware bundle is a blocking firmware bundle or that the firmware versions of the firmware manifest are not a permissible combination.

4. A method of providing a firmware update from a server, the method comprising:
receiving, at the server, a firmware manifest for a payment reader, wherein the firmware manifest includes a firmware version for each of a plurality of firmware assets of the payment reader;
accessing, at the server, a plurality of firmware bundles, wherein each firmware bundle comprises an ordered listing of permitted combinations of firmware versions for the plurality of firmware assets;
comparing, at the server, an ordered listing of the firmware versions of the firmware manifest with one or more of the firmware bundles;
identifying, at the server, an update firmware bundle of the plurality of firmware bundles;
generating, at the server, a firmware update for the payment reader based on the update firmware bundle and the firmware manifest;
determining, at the server, whether the update firmware bundle is a blocking firmware bundle that does not permit parallel processing of a payment transaction at the payment reader to continue while firmware of the payment reader is being updated;
generating, at the server, a parallel processing indicator based on the firmware manifest or the update firmware bundle, wherein the parallel processing indicator indicates whether parallel processing of the payment transaction should continue at the payment reader during the firmware update; and
transmitting, from the server, the firmware update and the parallel processing indicator to the payment reader.

5. The method of claim 4, wherein each firmware asset includes instructions for operating a component of the payment reader.

6. The method of claim 4, further comprising determining, at the server, whether the firmware versions of the firmware manifest are a permissible combination of firmware versions, wherein the determining comprises:
identifying the firmware versions of the firmware manifest as a permissible combination if the ordered listing for the firmware manifest matches one of the firmware bundles; and
identifying the firmware versions of the firmware manifest as a permissible combination if the ordered listing for the firmware manifest corresponds to a transition state between two firmware bundles.

7. The method of claim 4, wherein generating a firmware update based on the update firmware bundle and the firmware manifest comprises:
comparing firmware versions of the ordered listing for the firmware manifest to corresponding firmware versions for the update firmware bundle; and
identifying the firmware update based on firmware versions of the ordered listing for the firmware manifest that do not match the corresponding firmware versions of the update firmware bundle.

8. The method of claim 4, wherein identifying an update firmware bundle of the plurality of firmware bundles comprises:
determining whether a subsequent blocking firmware bundle exists;
identifying a first firmware bundle as the update firmware bundle if the subsequent blocking bundle exists; and
identifying a second firmware bundle as the update firmware bundle if no subsequent blocking bundle exists.

9. The method of claim 8, wherein the first firmware bundle comprises the most recent blocking firmware bundle.

10. The method of claim 8, wherein the first firmware bundle comprises a subsequent bundle to the most recent blocking firmware bundle.

11. The method of claim 8, wherein the second firmware bundle comprises the next firmware bundle of the plurality of firmware bundles.

12. The method of claim 4, wherein the parallel processing indicator is indicative that the update firmware bundle is a blocking firmware bundle or that the firmware versions of the firmware manifest are not a permissible combination.

13. A server, comprising:
a communication interface configured to receive a firmware manifest from a payment reader, transmit a parallel processing indicator to the payment reader, and transmit a firmware update to the payment reader;
one or more memories comprising firmware update instructions and information relating to a plurality of firmware bundles, wherein each firmware bundle comprises an ordered listing of permitted combinations of firmware versions for the plurality of firmware assets;
a processing unit configured to execute the firmware update instructions, to receive the firmware manifest, and access the information relating to the plurality of firmware bundles, wherein the processing unit is configured to compare an ordered listing of the firmware versions of the firmware manifest with one or more of the firmware bundles, identify an update firmware bundle of the plurality of firmware bundles, generate a firmware update for the payment reader based on the update firmware bundle and the firmware manifest, determine whether the update firmware bundle is a blocking firmware bundle that does not permit parallel processing of a payment transaction at the payment reader to continue while firmware of the payment reader is being updated, generate a parallel processing indicator based on the firmware manifest or the update firmware bundle, and provide the firmware update and the parallel processing indicator to the communication interface, wherein the parallel processing indicator indicates whether parallel processing of the payment transaction should continue at the payment reader during the firmware update.

14. The server of claim 13, wherein each firmware asset includes instructions for operating a component of the payment reader.

15. The server of claim 13, wherein the processing unit is further configured identify the firmware versions of the firmware manifest as a permissible combination if the ordered listing for the firmware manifest matches one of the firmware bundles and identify the firmware versions of the firmware manifest as a permissible combination if the ordered listing for the firmware manifest corresponds to a transition state between two firmware bundles.

16. The server of claim 13, wherein the processing unit is further configured to compare firmware versions of the ordered listing for the firmware manifest to corresponding firmware versions for the update firmware bundle, identify the firmware update based on the firmware versions of the ordered listing for the firmware manifest that do not match the corresponding firmware version of the update firmware bundle, and generate the firmware update based on the identified firmware versions.

17. The server of claim 13, wherein the processing unit is further configured to determine whether a subsequent blocking firmware bundle exists, identify a first firmware bundle as the update firmware bundle if the subsequent blocking bundle exists, and identify a second firmware bundle as the update firmware bundle if no subsequent blocking bundle exists.

18. The server of claim 17, wherein the first firmware bundle comprises the most recent blocking firmware bundle.

19. The server of claim 17, wherein the first firmware bundle comprises a subsequent bundle to the most recent blocking firmware bundle.

20. The server of claim 17, wherein the second firmware bundle comprises the next firmware bundle of the plurality of firmware bundles.

21. The server of claim 13, wherein the parallel processing indicator is indicative that the update firmware bundle is a blocking firmware bundle or that the firmware versions of the firmware manifest are not a permissible combination.

22. A non-transitory computer-readable storage medium comprising instructions stored therein, which when executed by one or more processors of a server, cause the one or more processors to perform operations comprising:
accessing a plurality of firmware bundles, wherein each firmware bundle comprises an ordered listing of permitted combinations of firmware versions for a plurality of firmware assets of a payment reader;
comparing an ordered listing of the firmware versions of a firmware manifest with one or more of the firmware bundles;
identifying an update firmware bundle of the plurality of firmware bundles;
generating a firmware update for the payment reader based on the update firmware bundle and the firmware manifest;
determining whether the update firmware bundle is a blocking firmware bundle that does not permit parallel processing of a payment transaction at the payment reader to continue while firmware of the payment reader is being updated;
generating a parallel processing indicator based on the firmware manifest or the update firmware bundle, wherein the parallel processing indicator indicates whether parallel processing of the payment transaction should continue at the payment reader during the firmware update; and
providing the firmware update and the parallel processing indicator to the payment reader.

23. The non-transitory computer-readable storage medium of claim 22, wherein each firmware asset includes instructions for operating a component of the payment reader.

24. The non-transitory computer-readable storage medium of claim 22, wherein the instructions further cause the one or more processors to perform operations comprising determining whether the firmware versions of the firmware manifest are a permissible combination of firmware versions, and wherein the determining whether the firmware versions of the firmware manifest are a permissible combination of firmware versions comprises:
identifying the firmware versions of the firmware manifest as a permissible combination if the ordered listing for the firmware manifest matches one of the firmware bundles; and
identifying the firmware versions of the firmware manifest as a permissible combination if the ordered listing for the firmware manifest corresponds to a transition state between two firmware bundles.

25. The non-transitory computer-readable storage medium of claim 22, wherein generating a firmware update based on the update firmware bundle and the firmware manifest comprises:
comparing firmware versions of the ordered listing for the firmware manifest to corresponding firmware versions for the update firmware bundle; and identifying the firmware update based on the firmware versions of the ordered listing for the firmware manifest that do not match the corresponding firmware version of the update firmware bundle.

26. The non-transitory computer-readable storage medium of claim 22, wherein identifying an update firmware bundle of the plurality of firmware bundles comprises:
determining whether a subsequent blocking firmware bundle exists;
identifying a first firmware bundle as the update firmware bundle if the subsequent blocking bundle exists; and
identifying a second firmware bundle as the update firmware bundle if no subsequent blocking bundle exists.

27. The non-transitory computer-readable storage medium of claim 26, wherein the first firmware bundle comprises the most recent blocking firmware bundle.

28. The non-transitory computer-readable storage medium of claim 26, wherein the first firmware bundle comprises a subsequent bundle to the most recent blocking firmware bundle.

29. The non-transitory computer-readable storage medium of claim 26, wherein the second firmware bundle comprises the next firmware bundle of the plurality of firmware bundles.

30. The non-transitory computer-readable storage medium of claim 22, wherein the parallel processing indicator is indicative that the update firmware bundle is a blocking firmware bundle or that the firmware versions of the firmware manifest are not a permissible combination.

\* \* \* \* \*